United States Patent
Oshima

(10) Patent No.: US 8,348,269 B2
(45) Date of Patent: Jan. 8, 2013

(54) IMAGE SCANNING DEVICE AND DOCUMENT TRANSPORTING METHOD

(75) Inventor: Osamu Oshima, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 76 days.

(21) Appl. No.: 12/899,673

(22) Filed: Oct. 7, 2010

(65) Prior Publication Data

US 2011/0248439 A1    Oct. 13, 2011

(30) Foreign Application Priority Data

Oct. 8, 2009 (JP) .................................. 2009-234108

(51) Int. Cl.
*B65H 7/02* (2006.01)
*B65H 83/00* (2006.01)
*G03G 15/00* (2006.01)

(52) U.S. Cl. .................. 271/265.01; 271/3.15; 399/367; 399/368

(58) Field of Classification Search ........ 271/3.11–3.17, 271/4.03, 264, 265.01; 399/17, 364, 367, 399/368, 370–373; 359/488, 489

See application file for complete search history.

(56) References Cited

U.S. PATENT DOCUMENTS

| | | | | |
|---|---|---|---|---|
| 5,907,759 A | * | 5/1999 | Yashiro | 399/371 |
| 6,032,941 A | * | 3/2000 | Endo | 271/3.19 |
| 2008/0308995 A1 | * | 12/2008 | Tobinaga et al. | 271/8.1 |
| 2010/0014902 A1 | * | 1/2010 | Tokutsu et al. | 399/372 |

FOREIGN PATENT DOCUMENTS

| | | |
|---|---|---|
| JP | 10-181955 A | 7/1998 |
| JP | 2009-10861 A | 1/2009 |

* cited by examiner

*Primary Examiner* — Patrick Cicchino
(74) *Attorney, Agent, or Firm* — Keating & Bennett, LLP

(57) ABSTRACT

An image scanning device includes a scanning specifying unit, at least two document detecting units, a supply timing adjusting unit, and a document supplying unit. The scanning specifying unit specifies one of at least two scanning methods each having a different transportation interval between documents. The document detecting units are at least two in number and arranged to detect a document at different positions on a transportation route. The supply timing adjusting unit is arranged to measure a transportation distance of the document after detection by the document detecting units and to generate a supply signal. The document supplying unit is arranged to supply a document from a paper feed tray based on the supply signal. The supply timing adjusting unit is arranged to generate the supply signal based on a result of detection by the document detecting unit that corresponds to the specified scanning method.

11 Claims, 16 Drawing Sheets

ONE-SIDE SCANNING

CONSECUTIVE SCANNING OF SEQUENTIAL METHOD

DOUBLE-SIDE SCANNING OF BATCH METHOD

DOUBLE-SIDE SCANNING OF ALTERNATING METHOD

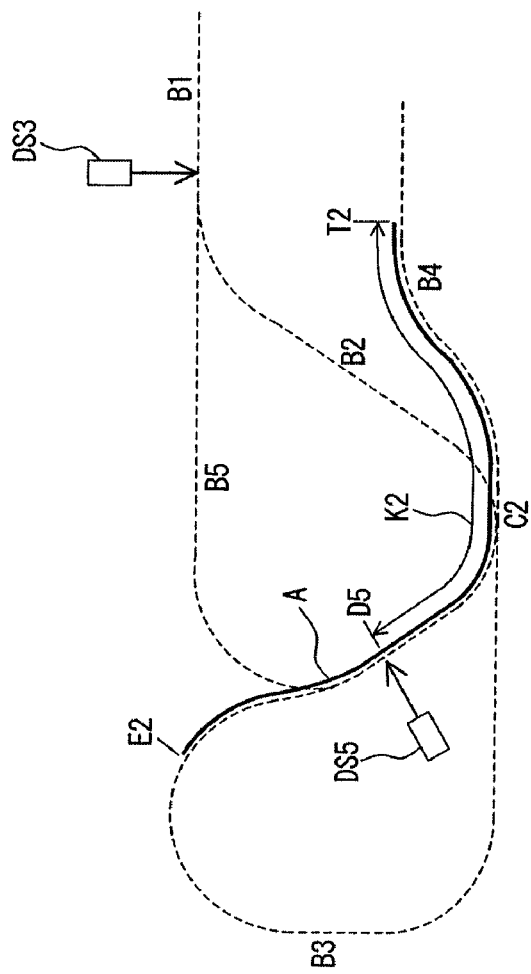

DOUBLE-SIDE SCANNING OF BATCH METHOD

IMAGE SCANNING DEVICE AND DOCUMENT TRANSPORTING METHOD

CROSS-REFERENCE TO RELATED APPLICATION

This application claims priority under 35 U.S.C. 119 to Japanese Patent Application No. 2009-234108, filed on Oct. 8, 2009, which application is hereby incorporated by reference in its entirety.

BACKGROUND OF THE INVENTION

1. Field of the Invention

The present invention relates to image scanning devices and document transporting methods, and in particular to an improvement of an image scanning device that consecutively supplies and transports at least two documents.

2. Description of the Related Art

Image scanning devices capable of automatically transporting two or more documents and sequentially scanning the documents are widely used. Further, image scanning devices capable of carrying out double-side scanning of a document by automatic transportation are also widely used. As types of such image scanning devices capable of carrying out double-side scanning, a 1-pass-2-scanner method and a 2-pass-1-scanner method are known. The 1-pass-2-scanner method carries out the double-side scanning of a document using two image sensors. The 2-pass-1-scanner method carries out the double-side scanning of a document using a single image sensor and turning sides of the document during the automatic transportation.

A switching back technique and a U-turn technique are known as the double-side scanning by the 2-pass-1-scanner method. According to the switching back technique, a document is caused to pass through a single image sensor twice in a same direction by carrying out a switch-back for switching a transportation direction during the transportation of the document. According to the U-turn technique in which the transportation paths are crossed using a U-turn path, a document is caused to pass through a single image sensor twice in opposite directions. Employing the U-turn technique eliminates the necessity of switching the transportation direction, and it is possible to simplify a transport control and to reduce time for scanning.

When two or more documents are automatically fed in such an image scanning device, it is controlled such that a transportation interval between the documents is constant by determining a timing for supplying a succeeding document from a paper feed tray based on a transportation position of a previous document. Specifically, it is detected that the previous document has arrived at a detection position on a transportation route using an optical sensor, and an amount of transportation of the document after the detection is measured, thereby determining a timing for supplying the succeeding document. The measurement of the transportation amount is carried out, for example, by counting the number of steps supplied to a step motor for transportation using a counter, and the succeeding document is supplied when a value of the count number by the counter reaches a predetermined value.

In the case of an image scanning device in which the transportation interval between documents is different depending on an operational state, providing such a counter makes it possible to change the transportation interval by changing the value of the count number by the counter. For example, in the case of an image scanning device employing the U-turn technique, it is necessary to increase the transportation interval in the double-side scanning in which a document is caused to pass through an image sensor twice via a U-turn path in comparison with the case of the one-side scanning in which a document does not pass through the U-turn path. Accordingly, in the double-side scanning as compared to the case of the one-side scanning, it is required to cause the counter that generates a supply timing to count a greater value of the count number.

In the conventional image scanning device, a timing at which a document has arrived at a predetermined detection position is correctly detected by detecting the document that is being transported using an optical sensor. Further, by counting a transportation amount of the document that has been detected by the optical sensor after the detection using a counter, it is possible to change a transportation interval by changing the value of the count number by the counter.

However, the measurement of the transportation amount by the counter includes an error due to slipping of a document or the like. Therefore, increasing the value of the count number by the counter also increases the error, thereby posing a problem of decreasing an accuracy of the transportation interval. Accordingly, there is a problem that, when a difference between two selectable transportation intervals in the same image scanning device increases, the value of the count number by the counter increases in a case where a longer transportation interval is selected, thereby reducing a control accuracy of the transportation interval. Further, a problem has been noted that a counter with more digits is required, thereby increasing production cost.

SUMMARY OF THE INVENTION

In view of the above circumstances, preferred embodiments of the present invention improve the control accuracy of the transportation interval between documents. In particular, preferred embodiments of the present invention improve the control accuracy when the transportation interval is long in the image scanning device with which the transportation interval between the documents can be changed. In addition, preferred embodiments of the present invention provide such an improved image scanning device at a moderate price.

An image scanning device according to a preferred embodiment of the present invention includes a scanning specifying unit, at least two document detecting units, a supply timing adjusting unit, and a document supplying unit. The scanning specifying unit is arranged to specify one of at least two scanning methods each having a different transportation interval between documents. The document detecting units are preferably at least two in number and arranged to detect a document at different positions along a transportation route. The supply timing adjusting unit is arranged to measure a transportation distance of the document after the detection by the at least two document detecting units and generates a supply signal. The document supplying unit is arranged to supply a document from a paper feed tray based on the supply signal. The supply timing adjusting unit is arranged to generate the supply signal based on a result of the detection by one of the least two document detecting units that corresponds to the specified scanning method.

In such a structure, by selecting the document detecting unit according to the specified scanning method, a previous document can be detected at different positions along the transportation route, and a supply timing of a succeeding document can be determined. Accordingly, in the image scanning device in which the transportation interval is different according to the scanning method, it is possible to prevent the transportation distance to be measured after the detection of the previous document from becoming long according to a difference between the transportation intervals. Therefore, it is possible to prevent a control accuracy of the transportation interval from being deteriorated due to a measurement error of the transportation distance. Further, it is possible to prevent a size of a circuit arranged to measure the transportation distance from becoming larger as well as the production cost from increasing.

In addition to the above structure, in the image scanning device according to a preferred embodiment of the present invention, the at least two document detecting units include a first document detecting unit and a second document detecting unit. The second document detecting unit is arranged to detect a document on a downstream side from the first document detecting unit. The scanning specifying unit is arranged to specify one of double-side scanning having a long transportation interval and one-side scanning having a short transportation interval. The supply timing adjusting unit is arranged to generate, when the one-side scanning is specified, a supply signal based on a result of the detection by the first document detecting unit, and, when the double-side scanning is specified, to generate a supply signal based on a result of the detection by the second document detecting unit.

According to such a structure, in the image scanning device in which the transportation interval in the double-side scanning is longer than that in the one-side scanning, the supply timing is determined based on the detection result of the first document detecting unit on the upstream side in the one-side scanning, and the supply timing is determined based on the detection result of the second document detecting unit on the downstream side in the double-side scanning. Therefore, it is possible to prevent the transportation distance to be measured in the double-side scanning from becoming long according to a difference between the transportation intervals in the double-side scanning and in the one-side scanning compared to a case in the one-side scanning.

Further, in addition to the above structure, the image scanning device according to a preferred embodiment of the present invention includes a path switching unit that is arranged to select, at a branch point on the transportation route, one of a first transportation path for the double-side scanning and a second transportation path for the one-side scanning. The first transportation path includes a U-turn path arranged to cause the document that has passed a scan position to turn around and to move again to the scan position from an opposite direction. The second transportation path is arranged to join the U-turn path without passing the scan position. The first document detecting unit is arranged to detect a document on an upstream side from the branch point. The second document detecting unit is arranged to detect the document on the first transportation path.

According to such a structure, in the image scanning device, the transportation route is arranged to branch into the first transportation path that passes the U-turn path and the second transportation path that does not pass the U-turn path. Further, according to this image scanning device, the first transportation path is used in the double-side scanning and the second transportation path is used in the one-side scanning. With such an image scanning device, it is possible to prevent the transportation distance to be measured in the double-side scanning from becoming long according to the length of the U-turn path compared to the one-side scanning.

Moreover, in an image scanning device according to a preferred embodiment of the present invention, at least two different transportation intervals are cyclically repeated when a plurality of documents are sequentially supplied. The image scanning device includes document detecting units, a supply timing adjusting unit, and a document supplying unit. The document detecting units are preferably at least two in number and arranged to detect a document at different positions on a transportation route. The supply timing adjusting unit is arranged to measure a transportation distance of the document after detection by the at least two document detecting units and generates a supply signal. The document supplying unit is arranged to supply documents from a paper feed tray based on the supply signal. The supply timing adjusting unit is arranged to generate the supply signal based on a result of the detection by the document detecting unit that corresponds to the transportation interval.

According to such a structure, in the image scanning device in which the plurality of documents are sequentially supplied while the transportation intervals between the documents are made different, by selecting the document detecting unit according to the transportation interval to the succeeding document, it is possible to detect the previous document at a different position on the transportation route, and to determine the supply timing of the succeeding document. Accordingly, in the image scanning device in which the different transportation intervals are cyclically repeated, it is possible to prevent a maximum value of the transportation distance to be measured after the detection of the previous document from becoming long according to a difference between the transportation intervals. Therefore, it is possible to prevent a control accuracy of the transportation interval from being deteriorated due to a measurement error of the transportation distance. Further, it is possible to prevent a size of a circuit arranged to measure the transportation distance from becoming larger, as well as the production cost from increasing.

Further, in addition to the above structure, in the image scanning device according to a preferred embodiment of the present invention, at least two consecutively supplied documents are taken as a single document group, and a transportation interval within the document group is made different from a transportation interval between the document group and a different document group.

According to such a structure, in the image scanning device, by changing the transportation interval within the document group and the transportation interval between the document groups, the different transportation intervals are cyclically repeated. In such an image scanning device, it is possible to prevent a maximum value of the transportation distance to be measured after the detection of the previous document from becoming long according to a difference between the transportation intervals.

Moreover, a document transporting method according to a preferred embodiment of the present invention includes a scanning specifying step, a detecting step, a supply timing adjusting step, a and document supplying step. In the scanning specifying step, one of at least two scanning methods each having a different transportation interval between documents is specified. In the detecting step, a document that is being transported is detected using at least two document detecting sensors with different detection positions. In the supply timing adjusting step, a transportation distance of the document after the detection in the document detecting step is measured and a supply signal is generated. In the document supplying step, a document is supplied from a paper feed tray based on the supply signal. In the supply timing adjusting step, the supply signal is generated based on a result of detection by the document detecting sensor that corresponds to the specified scanning method.

Further, in addition to the above structure, in the document transporting method according to a preferred embodiment of the present invention, in the scanning specifying step, one of double-side scanning and one-side scanning is specified. In the supply timing adjusting step, when the one-side scanning is specified, a supply signal is generated based on a result of the detection by a first document detecting sensor. Also, in the supply timing adjusting step, when the double-side scanning is specified, a supply signal is generated based on a result of detection by a second document detecting sensor that detects a document on a downstream side from the first document detecting sensor.

Moreover, in a document transporting method according to a preferred embodiment of the present invention, at least two different transportation intervals are cyclically repeated when a plurality of documents are sequentially supplied. The document transporting method includes a detecting step, a supply timing adjusting step, and a document supplying step. In the detecting step, a document that is being transported is detected using at least two document detecting sensors with different detection positions. In the supply timing adjusting step, a transportation distance of the document after the detection in the detecting step is measured and a supply signal is generated. In the document supplying step, documents are supplied from a paper feed tray based on the supply signal. In the supply timing adjusting step, the supply signal is generated based on a result of detection by the document detecting sensor that corresponds to the transportation interval.

The image scanning device according to a preferred embodiment of the present invention includes the at least two document detecting units, and by selecting the document detecting unit according to the scanning method, the previous document can be detected at the different position on the transportation route, and a supply timing of the succeeding document can be determined. Accordingly, in the image scanning device in which the transportation interval is different according to the scanning method, it is possible to prevent the transportation distance to be measured after the detection of the previous document from becoming long according to a difference between the transportation intervals.

The image scanning device according to a preferred embodiment of the present invention includes the at least two document detecting units, and by selecting the document detecting unit according to the transportation interval of the document, the previous document can be detected at the different position on the transportation route, and a supply timing of the succeeding document can be determined. Accordingly, in the image scanning device in which one of the at least two transportation intervals can be selected, it is possible to prevent the transportation distance to be measured after the detection of the previous document from becoming long according to a difference between the transportation intervals.

Therefore, it is possible to prevent an error in the transportation interval from increasing due to a measurement error of the transportation distance, thereby improving a control accuracy of the transportation interval. Further, it is possible to prevent a size of a circuit arranged to measure the transportation distance from becoming larger, as well as the production cost from increasing, and such an improved image scanning device can be provided at a moderate price.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 9 is a view illustrating one example of a supply timing in the double-side scanning of the sequential method.

DETAILED DESCRIPTION OF THE PREFERRED EMBODIMENTS

Figure 1:
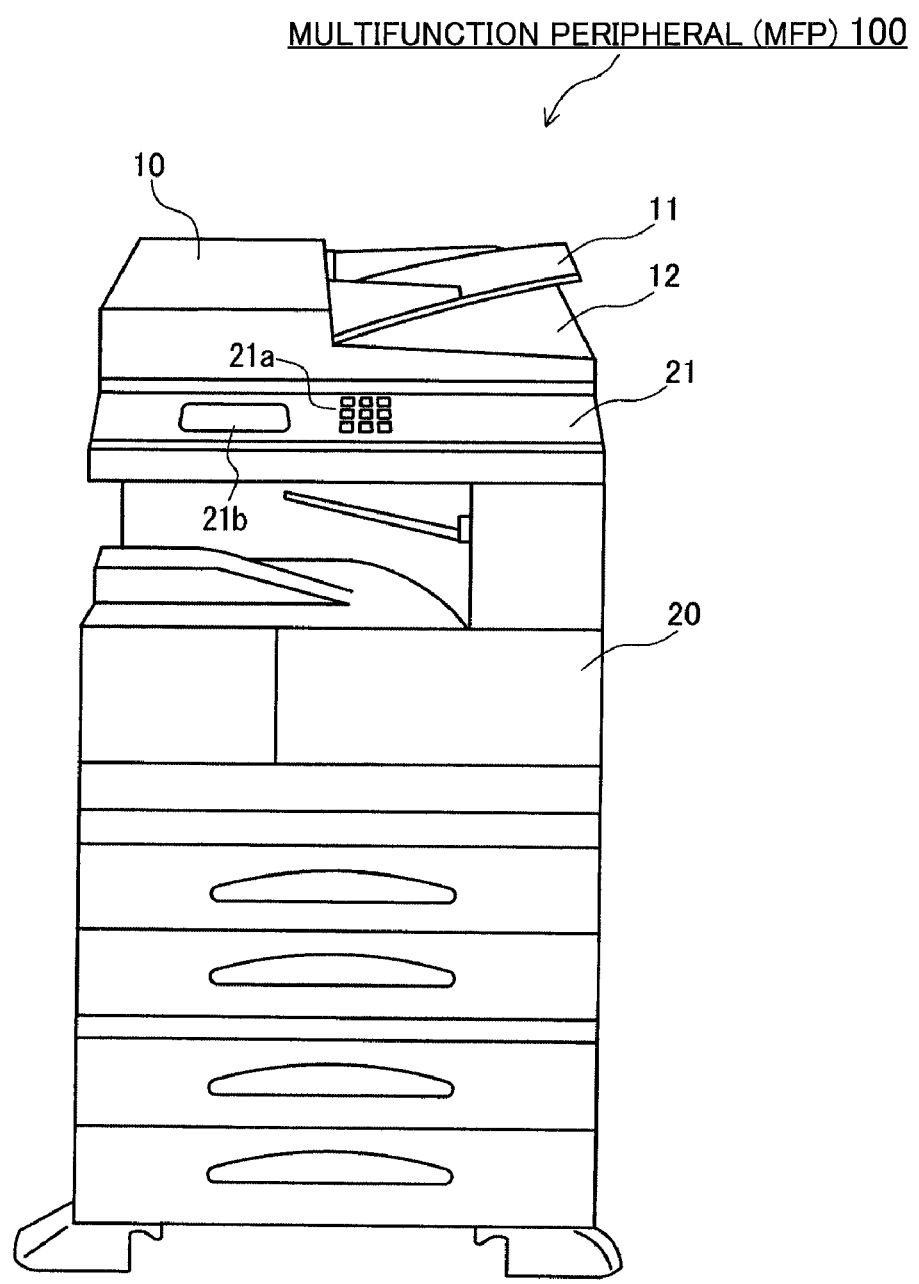
FIG. 1 is an external view illustrating one exemplary structure of an image scanning device according to a preferred embodiment of the present invention.

FIG. 1 is an external view illustrating one exemplary structure of an image scanning device according to a preferred embodiment of the present invention, illustrating a Multifunction Peripheral (MFP) 100 as one example of the image scanning device. The MFP 100 includes an MFP main unit 20 and an Auto Document Feeder (ADF) device 10. The MFP main unit 20 carries out image scanning, printing, sending and receiving facsimile, and such. The ADF device 10 carries out automatic transportation of a document in the image scanning.

An operation panel 21 of the MFP main unit 20 includes an operation input unit 21a and a liquid crystal display unit 21b. The operation input unit 21a may preferably include elements such as a start key and number keys with which a user carries out operation inputs. The liquid crystal display unit 21b outputs a display of an operational state to the user. For example, by carrying out the operation input to the operation input unit 21a, the user is able to specify one of one-side scanning and double-side scanning of the document. Further, when a delay in transporting the document or the like occurs, the liquid crystal display unit 21b carries out an error display.

Moreover, on an upper surface of the MFP main unit 20, a contact glass not illustrated in the drawings is provided. On the contact glass, the ADF device 10 is arranged to be opened and closed. In other words, the MFP 100 is able to scan a document in either of a flatbed mode and an ADF mode. In the flatbed mode, a document placed on the contact glass is scanned. In the ADF mode, a document that is being automatically transported by the ADF device 10 is scanned.

The ADF device 10 includes a paper feed tray 11 and a discharge tray 12. Transportation paths are provided within the ADF device 10. Documents in the paper feed tray 11 are supplied separately one by one, transported along the transportation path, and discharged to the discharge tray 12. The transportation path is arranged so as to pass over the contact glass of the MFP main unit 20. Then, the documents are scanned by the MFP main unit 20 when passing over the contact glass.

Figure 2:
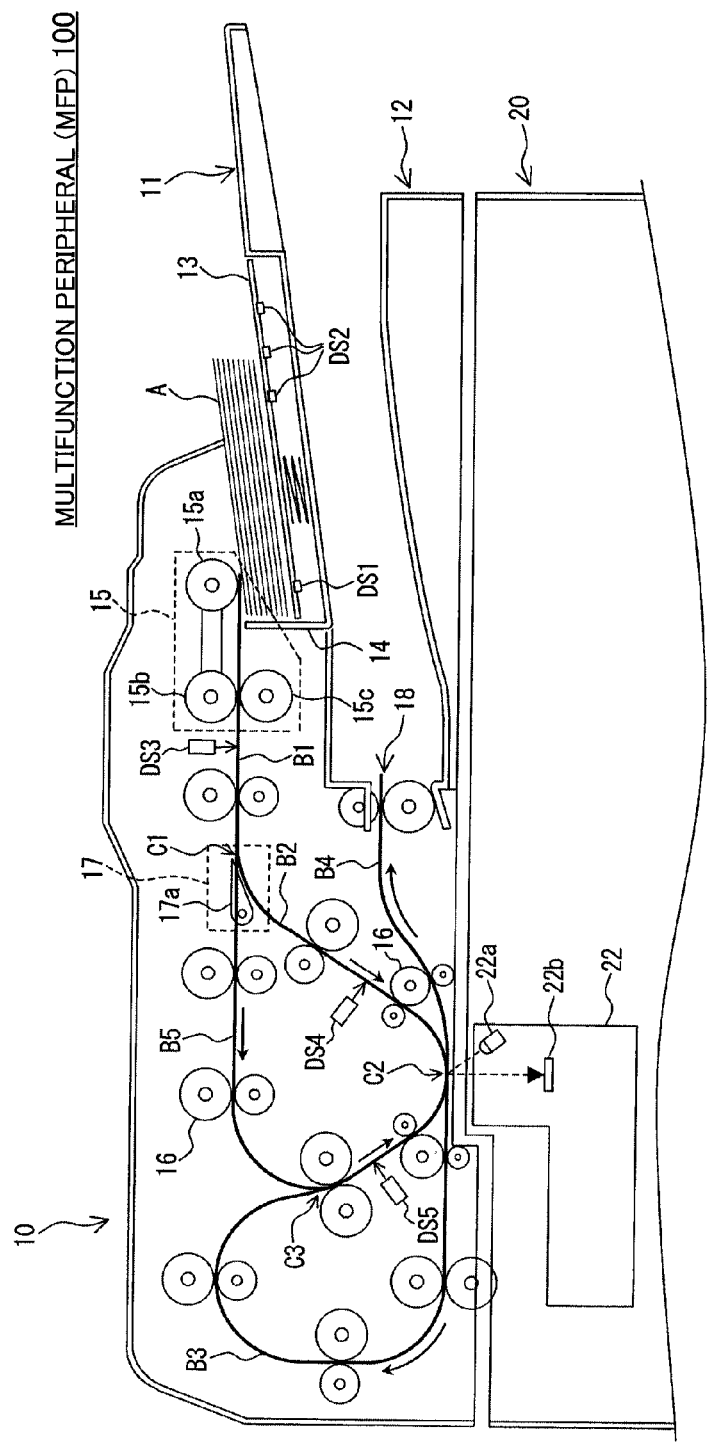
FIG. 2 is a cross-sectional view illustrating one exemplary structure of a main section of a Multifunction peripheral (MFP) 100 in FIG. 1.

FIG. 2 is a cross-sectional view illustrating one exemplary structure of a main section of the MFP 100 shown in FIG. 1, and mainly schematically illustrating an internal structure of the ADF device 10. Reference symbols B1 to B5 in this figure represent the transportation paths of the documents. A reference symbol C1 represents a branch point of the transportation paths B2 and B5. A reference symbol C2 represents a scan position of the documents. A reference symbol C3 represents a merge point of the transportation paths B3 and B5.

A scanner unit 22 is an image sensor that optically scans an image of a document A that passes the scan position C2. The scanner unit 22 includes a light projecting unit 22a and a line sensor 22b. Irradiation light from the light projecting unit 22a is reflected upon the document A of the contact glass, and detected by the line sensor 22b in which a large number of light receiving elements are linearly arranged. It is possible to scan a 2D image by moving the document A and the line sensor 22b relatively in a direction that crosses the arrangement direction. When the image scanning is carried out in the ADF mode, the scanner unit 22 is stopped and the image scanning is carried out to the document A that is being transported. The scanner unit 22 can also be used as a document detecting sensor that detects the arrival or the passing of the document A at or over the scan position C2.

The MFP 100 employs a 2-pass-1-scanner method. The MFP 100 carries out the double-side scanning using the singe scanner unit 22. The 2-pass-1-scanner method refers to a method of the double-side scanning in which sides of a document are turned over and the document is scanned twice by the same scanner unit 22. According to a typical image scanning device of the 2-pass-1-scanner method, the sides of the document A is turned over by switching back the document, and the document A is caused to pass another transportation path to merge before the scanner unit 22 and to pass the scanner unit 22 twice in the same direction. In contrast, the MFP 100 reverses the sides of the document A by causing the document A to turn around and to pass the scanner unit 22 twice. At this time, the directions in which the document A passes the scanner unit 22 are opposite between the first time and the second time.

The transportation paths B1 to B5 are provided in the ADF device 10, and the transportation route of the document A is different between the one-side scanning and the double-side scanning. When carrying out the double-side scanning, the document is transported through the transportation paths B1, B2, B3, and B4 in the stated order. This transportation route is referred to as a double-side path. On the other hand, when carrying out the one-side scanning, the document is transported through the transportation paths B1, B5, B3, and B4 in the stated order. This transportation route is referred to as a one-side path.

The transportation path B1 is a paper feeding path through which the document A that is supplied from the paper feed tray 11 is transported to the branch point C1. The transportation path B1 is used both in the one-side scanning and in the double-side scanning.

The transportation path B2 is an introducing path exclusive for the double-side scanning through which the document A for the double-side scanning is transported from the branch point C1 to the scan position C2. The document A is transported along the transportation path B2 substantially linearly to the scan position C2 without being turned around. The document that has entered from the transportation path B2 and passes through the scan position C2 from right to left enters the transportation path B3.

The transportation path B3 is a U-turn path arranged to cause the document for the double-side scanning to turn around to reverse the sides of the document. The document that has passed through the scan position C2 from right to left moves to a lower side of the transportation path B3, is transported in a clockwise direction, and whereby the sides of the document is reversed, and then the document returns to the scan position C2 from an upper side of the transportation path B3 and passes through the scan position C2 from left to right. In other words, by passing through the transportation path B3, it is possible to cause the document to pass through the scan position C2 twice in a state in which the sides of the document are reversed. At this time, the direction in which the document passes the scan position C2 is opposite between the first time and the second time. In the transportation path B3, a downstream side from the merge point C3 is also used in the one-side scanning.

The transportation path B4 is a discharging path through which the document that has passed through the scan position C2 from left to right is transported to a discharge outlet 18, thereby discharging the document to the discharge tray 12. The transportation path B4 is used both in the one-side scanning and in the double-side scanning.

The transportation path B5 is an introducing path exclusive for the one-side scanning through which the document A for the one-side scanning is transported from the branch point C1 to the merge point C3 on the transportation path B3. The transportation path B5 and the transportation path B3 constitute a laterally-facing U-shaped transportation path. The document for the one-side scanning that has moved onto the transportation path B3 from the merge point C3, in the completely same manner as the document for the double-side scanning, passes through the scan position C2 from left to right, enters the transportation path B4, and is discharged to the discharge tray 12.

The paper feed tray 11 includes a document table 13 on which documents are stacked and placed, and a document stopper 14 arranged to position the documents. The document table 13 is urged upward by an urging member such as a spring, and brings an uppermost document into contact with a pickup roller 15a. Further, leading edges in a feeding direction (left end in the figures) of the documents on the document table 13 are positioned by the document stopper 14. Therefore, the uppermost document is in a state in which the leading edge thereof is positioned and a portion around the leading edge is pressed against the pickup roller 15a.

A document supplying unit 15 is a document supply member that supplies the documents A in the paper feed tray 11 to the transportation path one by one. The document supplying unit 15 includes the pickup roller 15a, a separation roller 15b, and a retard roller 15c. The pickup roller 15a and the separation roller 15b are rotationally driven in the feeding direction of the document. The retard roller 15c is rotationally driven in a returning direction. Therefore, the documents A in the paper feed tray 11 are supplied sequentially from the top to the transportation path B1 by the pickup roller 15a. Only the uppermost one of the documents A that are multi-fed is separated by the separation roller 15b and the retard roller 15c that are rotating in opposite directions, and is transported in the feeding direction. A transportation interval of the documents A is controlled at a timing at which the document supplying unit 15 supplies the document A. In other words, the document supplying unit 15 supplies a succeeding document when a document that has been supplied previously arrives at a reference position on the transportation route, whereby the transportation interval of the documents A is controlled.

A transportation roller 16 includes a driving roller that is rotationally driven and a driven roller disposed so as to face the driving roller with the transportation path being interposed therebetween. A large number of transportation rollers 16 are disposed in the transportation paths B1 to B5 at intervals shorter than a minimum document length, and the document A is transported along the transportation path by the transportation rollers 16. The transportation rollers 16 are rotationally driven by transportation motors 34 that are not illustrated in the drawings. Driving a portion of the transportation motors 34 asynchronously with the rest of the transportation motors 34 requires special purpose clutches or the like, making the structure complicated and increasing the cost. Therefore, according to the present preferred embodiment, all of the transportation rollers 16 are driven by a single step motor and rotate in synchronization with each other.

A path switching unit 17 is a transportation route switching member arranged to select one of the one-side path and the double-side path. The path switching unit 17 is positioned at the branch point C1 on the transportation route. The path switching unit 17 is configured by a claw-shaped rotating member 17a and a solenoid not illustrated in the drawings. The path switching unit 17 switches between the transportation paths B2 and B5 by the solenoid turning the rotating member 17a. Specifically, when the double-side path is selected, the document A that has arrived at the branch point C1 is transported into the transportation path B2, and, when the one-side path is selected, the document A that has arrived at the branch point C1 is transported into the transportation path B5.

Assuming that a lower surface of the document A contained in the paper feed tray 11 is a first surface, and an upper surface of the document A is a second surface, the document A is scanned twice in the order of the first surface and the second surface in the double-side path, and only the second surface of the document A is scanned in the one-side path. Specifically, when the double-side path is selected, the document A passes in sequence through the transportation path B1, the branch point C1, and then to the transportation path B2, and is guided to the scan position C2 of the scanner unit 22, and whereby the first surface of the document A is scanned. Subsequently, the document A is again guided to the scan position C2 through the transportation path B3, the second surface of the document A is scanned, and then the document A is discharged from the discharge outlet 18 via the transportation path B4. On the other hand, when the one-side path is selected, the document A passes in sequence through the transportation path B1, the branch point C1, the transportation path B5, the merge point C3, and a latter half of the transportation path B3, and is guided to the scan position C2 of the scanner unit 22, and the second surface of the document A is scanned, and subsequently the document A is discharged from the discharge outlet 18 via the transportation path B4.

The ADF device 10 is provided with a plurality of document detecting sensors DS1 to DS5 (document detecting units). The document detecting sensors DS1 and DS2 are provided at the paper feed tray 11 and detect the document A placed on the document table 13. On the other hand, the document detecting sensors DS3 to DS5 detect the arrival or the passing of the document A that is being transported respectively at different detection positions D3 to D5. Optical sensors can be used as the document detecting sensors DS1 to DS5.

The document detecting sensor DS1 is a document placement detector arranged to detect whether or not the document A is placed in the paper feed tray 11. For example, it is possible to detect the presence of the document A by embedding a reflective optical sensor in the document table 13 near the document stopper 14 and detecting a portion near the leading edge the document A.

The document detecting sensor DS2 is a document length detector arranged to detect a length of the document A in the feeding direction. For example, it is possible to determine whether or not the document length is a predetermined length or longer by embedding an optical sensor in the document table 13 at a portion on the downstream side from the document detecting sensor DS1. In this case, if the two or more documents A of different sizes are stacked and placed, a maximum document length is detected. Further, by disposing two or more documents detect sensors DS2 at different positions in the feeding direction, it is possible to detect that the document length is within a predetermined range.

The document detecting sensors DS3 to DS5 are transportation state detectors arranged to monitor the detection positions D3 to D5 on the transportation path which are previously determined and detecting a position of the document A that is being transported. The document detecting sensors DS3 to DS5 detect the arrival or the passing of the document A at or through the detection positions D3 to D5. Specifically, it is possible to determine that the document A has arrived at the detection position if the leading edge of the document A is detected. It is possible to determine that the document A has passed the detection position if a trailing edge of the document A is detected. In this case, the document detecting sensor DS4 is disposed on the double-side path, and monitors only a double-side document. Further, the document detecting sensor DS3 on the upstream side and the document detecting sensor DS5 on the downstream side are both disposed on a common route between the one-side path and the double-side path, and monitor the one-side document and the double-side document.

The document detecting sensor DS3 monitors the detection position D3 on the transportation path B1 between the separation roller 15b and the branch point C1, and detects the document A that has been supplied into the transportation path B1 from the paper feed tray 11 by the document supplying unit 15. The length of the document A can be obtained by measuring an amount by which the document A has been transported during the detections of the leading edge and the trailing edge of the document A at the detection position D3. Further, a supply timing in a case where the transportation interval of the document is short is obtained based on a result of the detection of the trailing edge of the document A at the detection position D3.

The document detecting sensor DS4 monitors the detection position D4 on the transportation path B2 between the branch point C1 and the scan position C2, and detects the document A immediately before the document A arrives at the scan position C2. A scan timing of the first surface in the double-side scanning is obtained based on a result of the detection of the leading edge of the document A at the detection position D4.

The document detecting sensor DS5 monitors the detection position D5 on the transportation path B3 between the merge point C3 and the scan position C2, and detects the document A immediately before the document A arrives at the scan position C2. A scan timing of the second surface in the double-side scanning is obtained based on a result of the detection of the leading edge of the document A at the detection position D5. Further, a supply timing in a case where the transportation interval of the document is long is obtained based on a result of the detection of the leading edge of the document A at the detection position D5.

Moreover, the scanner unit 22 can also be used for the detection of the document A that is being transported in addition to the document detecting sensors DS3 to DS5. Specifically, it is possible to use the scanner unit 22 as a document detecting sensor, and to cause the scanner unit 22 to detect the arrival or the passing of the document A at or through the scan position C2.

FIGS. 3A to 7F are illustrative views how consecutive scanning of two or more documents A1 to A4 is carried out using the ADF device 10 shown in FIG. 2. In general, the ADF device 10 carries out the consecutive scanning in which two or more documents are simultaneously transported, thereby reducing scanning time per document.

In a case of the ADF device 10 having a crossed double-side path carries out the double-side scanning, depending on an order in which the documents A1 to A4 that are sequentially supplied pass the scan position C2, there are three scanning methods including a sequential method, a batch method, and an alternating method. Accordingly, in the present preferred embodiment, a user selects one of four scanning methods including the one-side scanning, the double-side scanning of the sequential method, the double-side scanning of the batch method, and the double-side scanning of the alternating method. Alternatively, it is possible that the user first selects between the one-side scanning and the double-side scanning, and when the double-side scanning is selected, one of the three scanning methods can be further selected depending on a document size detected by the document detecting sensor DS2.

Figure 3A:
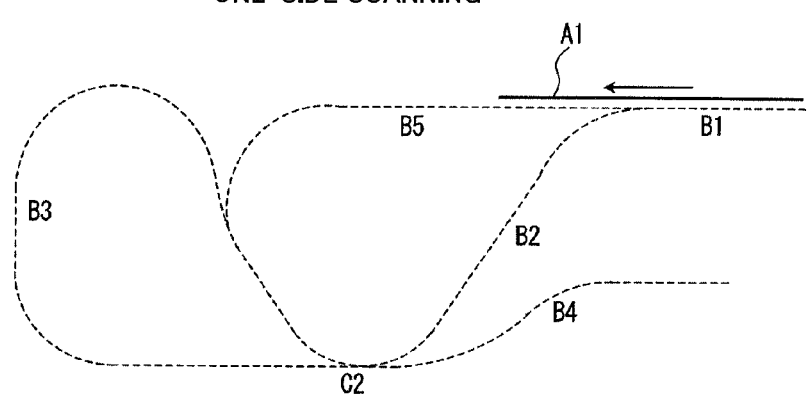
FIGS. 3A to 3C are illustrative views regarding one-side scanning.
Figure 3B:
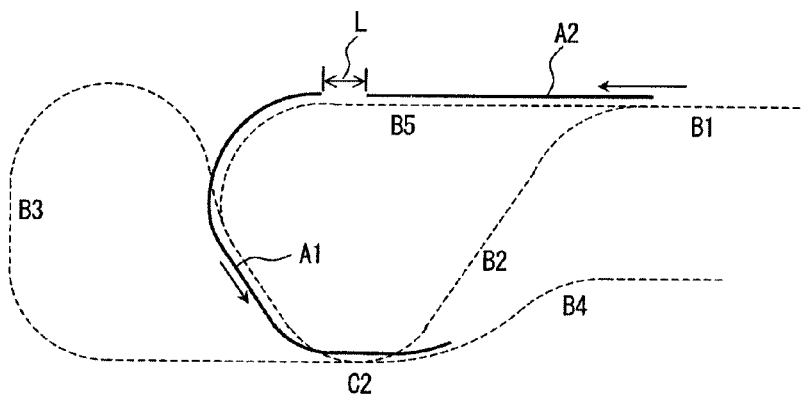
Figure 3C:
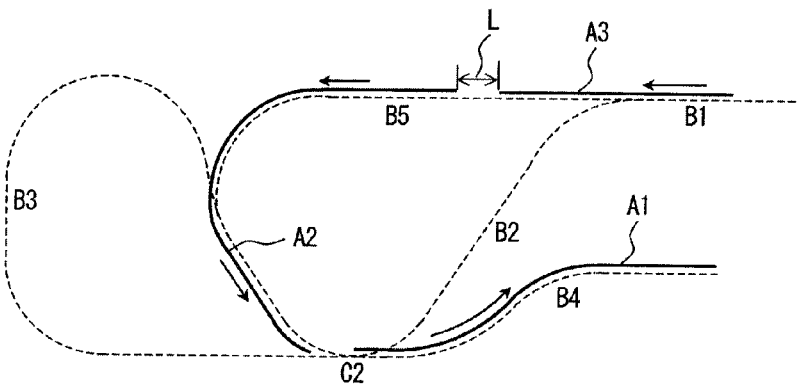

FIGS. 3A to 3C are illustrative views regarding the one-side scanning, illustrating transportation states of the documents A1 to A3 along the transportation paths B1 to B5 are shown in a chronological order. According to the one-side scanning, the two or more documents A1 to A3 are simultaneously transported such that the transportation interval between the documents corresponds to a predetermined value L.

As illustrated in FIGS. 3A to 3C, the documents A1 to A3 pass in sequence through the transportation paths B1 and B5, and a latter half of the transportation path B3, and arrive at the scan position C2, and subsequently the documents A1 to A3 are discharged via the transportation path B4. Specifically, the documents A1 to A3 pass through the scan position C2 only once and discharged to the discharge tray 12. Also as illustrated in FIGS. 3B and 3C, the supplying of the succeeding documents A2 and A3 starts before the respective preceding documents A1 and A2 are discharged.

The one-side scanning is a scanning method that reduces the scanning time per document by starting the supplying of the succeeding document A2 before the preceding document A1 is discharged. As the transportation route the one-side path is not crossed as in the double-side path, the one-side scanning can be selected regardless of the document length. Further, the transportation interval L in the one-side scanning can be made shorter than the transportation interval in the double-side scanning.

FIGS. 4A to 4D are illustrative views regarding the double-side scanning of the sequential method, illustrating transportation states of the documents A1 and A2 along the transportation paths B1 to B5 are shown in a chronological order. In the sequential method, two or more documents are not simultaneously transported along the transportation path B3 for U-turn, and the scanning of the succeeding document A2 starts after both sides of the preceding document A1 are scanned. Specifically, according to the sequential method, the two or more documents A1 and A2 are simultaneously transported such that a transportation interval La corresponds to a predetermined value that is longer than the transportation path B3.

Figure 4A:
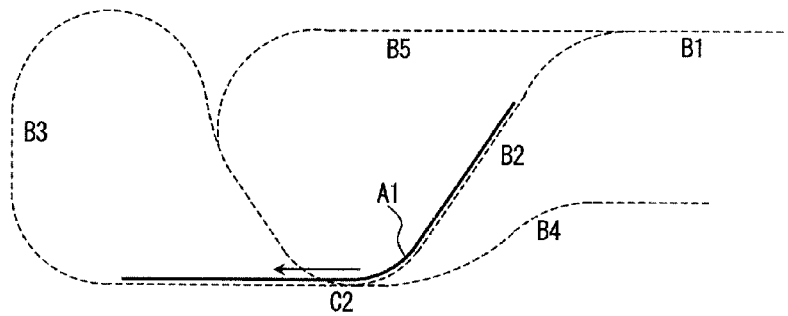
FIGS. 4A to 4D are illustrative views regarding double-side scanning of a sequential method.
Figure 4B:
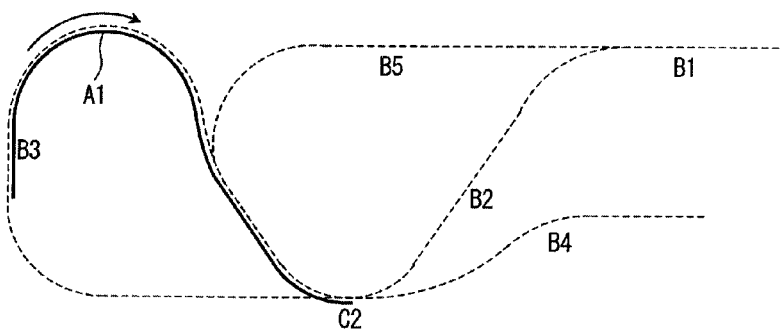
Figure 4C:
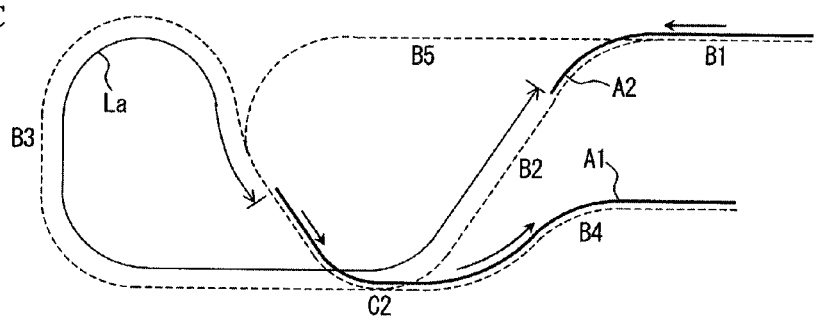
Figure 4D:
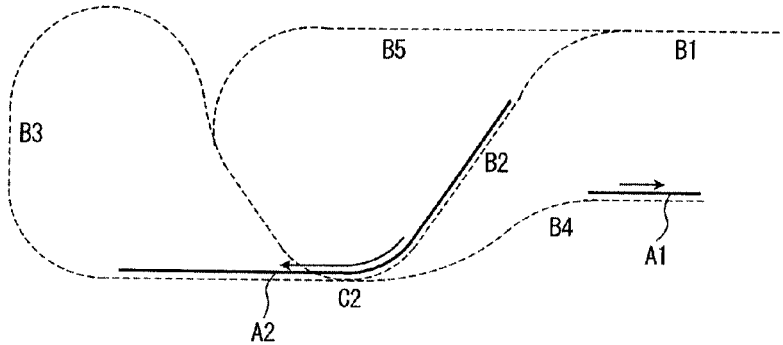

As illustrated in FIGS. 4A to 4C, the document A1 that has been previously supplied are transported in sequence through the transportation paths B1 to B3, and passes the scan position C2 twice. Also as illustrated in FIGS. 4C and 4D, the supplying of the succeeding document A2 starts before the preceding document A1 is discharged to the discharge tray 12 such that the document A2 arrives at the scan position C2 after the document A1 passes the scan position C2 twice.

The sequential method is a scanning method that reduces the scanning time per document by starting the supplying of the succeeding document A2 before the preceding document A1 is discharged. The sequential method is suitable for high-speed scanning of a relatively long document as it can be applied when the document length equals to the transportation path B3 or shorter. However, as this considerably extends the transportation interval, the scanning time per document becomes longer as compared to the two methods described below.

FIGS. 5A to 5D are illustrative views regarding the double-side scanning of the batch method, illustrating transportation states of the documents A1 to A3 along the transportation paths B1 to B5 are shown in a chronological order. In the batch method, the two or more documents A1 and A2 are simultaneously transported along the transportation path B3 for U-turn without being overlapped, and the double-side scanning is carried out taking this group of the documents as a single unit. Specifically, after the respective first surfaces of the preceding documents A1 and A2 are scanned, the respective second surfaces are scanned, and the scanning of the succeeding document A3 starts after the both sides of the preceding documents A1 and A2 are scanned.

Accordingly, in the batch method, the transportation interval La that is longer than the transportation path B3 and a transportation interval Lb that is shorter than the transportation path B3 are cyclically repeated. As illustrated, if two documents are simultaneously transported along the transportation path B3, the transportation intervals La and Lb are alternately repeated. Further, if the document length is short, it is possible to simultaneously transport three or more documents along the transportation path B3. In this case, a single transportation interval La and two or more the transportation intervals Lb are alternately repeated. Specifically, taking the two or more documents A1 and A2 that are simultaneously transported along the transportation path B3 as one document group, the different transportation intervals La and Lb are cyclically repeated such that the transportation interval between documents in the document group corresponds to Lb and the transportation interval between document groups corresponds to La. As the double-side path is longer than the one-side path, the transportation interval Lb in the document group is desirably longer than the transportation interval L in the one-side scanning, but can be the same when the transportation interval L in the one-side scanning has sufficient margin.

Figure 5A:
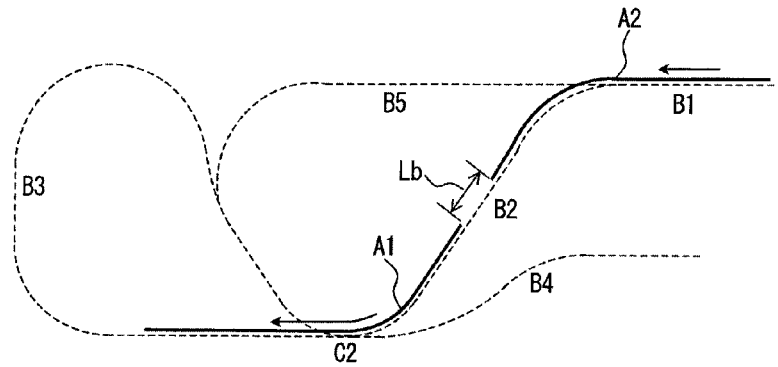
FIGS. 5A to 5D are illustrative views regarding double-side scanning of a batch method.
Figure 5B:
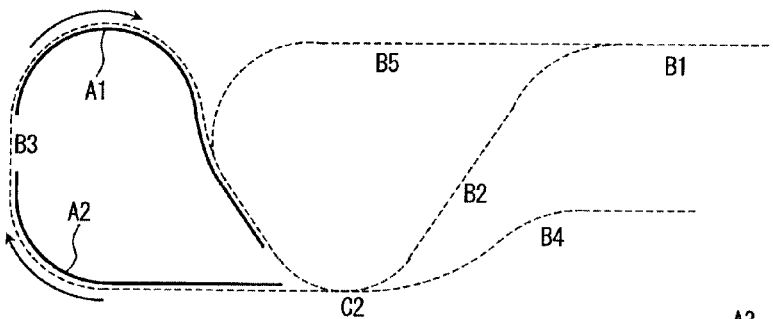
Figure 5C:
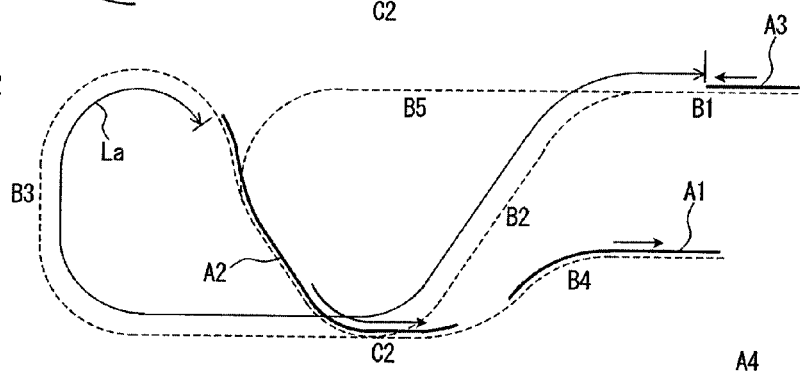
Figure 5D:
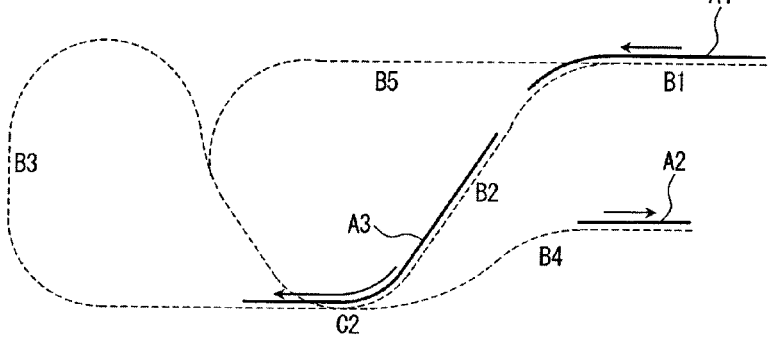

As illustrated in FIGS. 5A and 5B, the documents A1 and A2 that are sequentially supplied are transported in sequence along the transportation paths B1 to B3, and are simultaneously transported along the transportation path B3 after the first surfaces of the respective documents are scanned. Subsequently, the documents A1 and A2 are transported to the transportation path B4 passing the scan position C2, and the second surfaces of the respective documents are scanned (FIG. 5C). The supplying of the succeeding documents A3 and A4 is carried out before the preceding document A2 is discharged to the discharge tray 12 such that the document A3 arrives at the scan position C2 after both of the documents A1 and A2 pass the scan position C2 twice.

The batch method is a scanning method that reduces the scanning time per document by carrying out the double-side scanning of the document group including the two or more documents A1 and A2 in a batch in such a manner that the documents are consecutively moved to the scan position C2 from one of the transportation paths B2 and B3, and the two or more documents are simultaneously transported along the transportation path B3. In this case, the scanning time per document is further reduced by starting the supplying of the succeeding document A3 before both of the documents A1 and A2 are discharged. Although the batch method can reduce the scanning time per document even more as compared to the sequential method, it cannot be applied unless the document length is ½ of the length of the transportation path B3 or shorter.

FIGS. 6A to 7F are illustrative views regarding the alternating method, illustrating transportation states of the documents A1 to A4 along the transportation paths B1 to B5 in a chronological order. In the alternating method, the two or more documents A1 and A2 are simultaneously transported at the interval along the transportation path B3 for U-turn, and a single document is supplied alternately from the transportation paths B2 and B3 to the scan position C2. Specifically, according to the alternating method, three or more documents A1 to A3 are simultaneously transported such that, similarly to the sequential method, the interval between the two documents A1 and A3 that are transported with at least one document A2 being interposed therebetween corresponds to the predetermined value La that is longer than the transportation path B3. At this time, the transportation interval between the adjacent documents A1 and A2 is required to correspond to the transportation interval Lb or longer in the batch method.

Figure 6A:
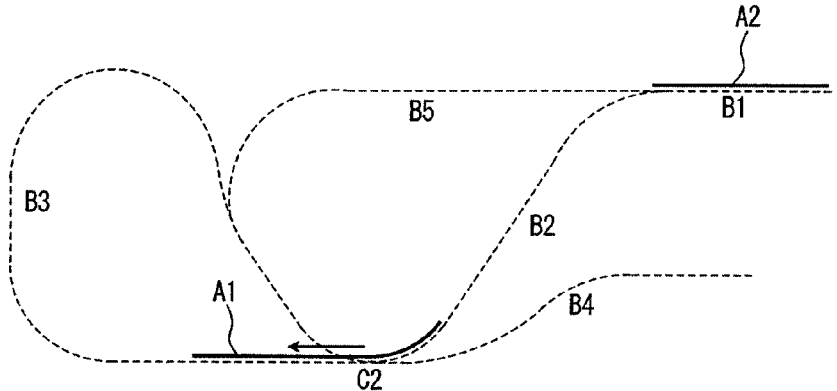
FIGS. 6A to 6D are illustrative views regarding double-side scanning of an alternating method.
Figure 6B:
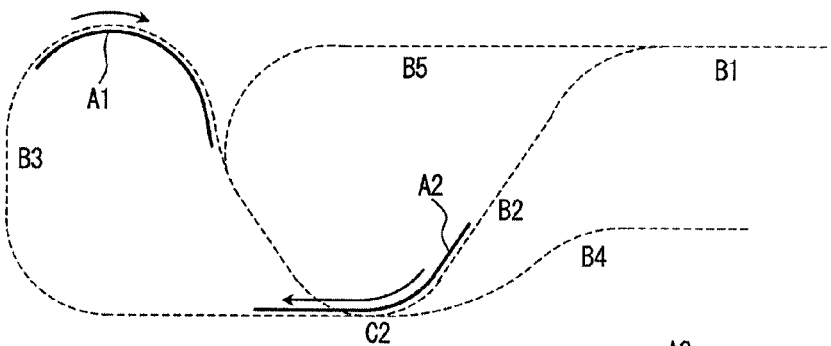
Figure 6C:
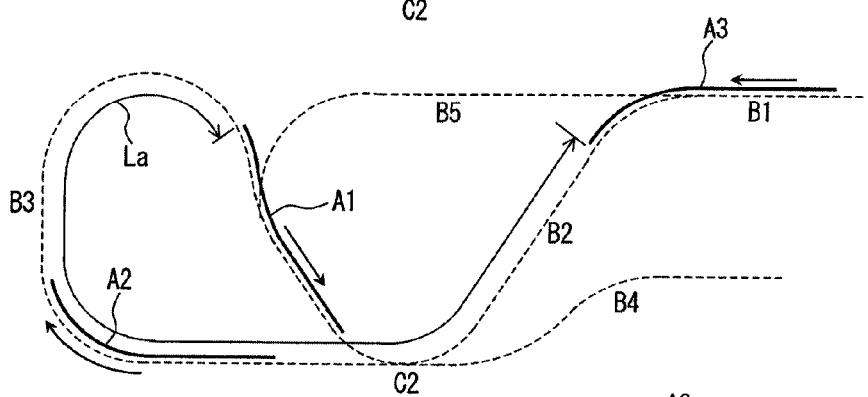

As illustrated in FIGS. 6A to 6C, the documents A1 and A2 that are sequentially supplied are transported in sequence along the transportation paths B1 to B3, and are simultaneously transported along the transportation path B3 after the first surfaces of the respective documents are scanned. As compared to the batch method of FIGS. 5A to 5D, a difference is that an interval for a single document or longer is provided between the documents A1 and A2. Specifically, according to the alternating method, the documents A1 and A2 are sequentially supplied with the interval for a single document or longer.

Figure 6D:
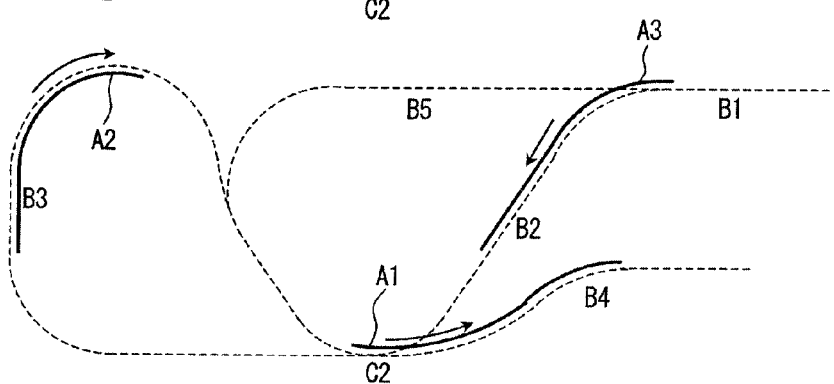

Subsequently, the document A1 moves to the scan position C2 from the transportation path B3, and its second surface is scanned (FIG. 6D). When the document A1 passes the scan position C2 and its trailing edge enters the transportation path B4, the document A3 moves to the scan position C2 from the transportation path B2, and its first surface is scanned (FIG. 6E).

The document A3 is also supplied such that an interval from the document A2 corresponds to La. In this case, the supplying of the document A3 starts before the leading edge of the document A1 arrives at the scan position C2. Further, the leading edge of the document A3 arrives at the scan position C2 after the document A1 passes the scan position C2 and its trailing edge enters the transportation path B4, and thereafter the trailing edge of the document A1 arrives at the discharge tray 12. Specifically, the three documents A1 to A3 are simultaneously transported along the transportation path.

Figure 7E:
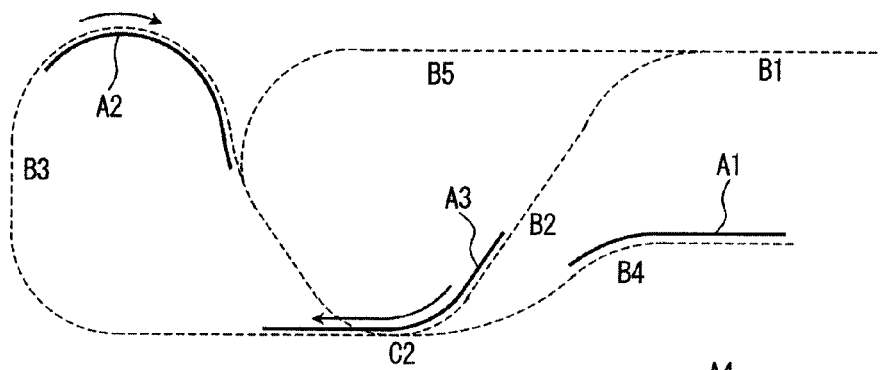
FIGS. 7E and 7F are illustrative views following FIGS. 6A to 6D.
Figure 7F:
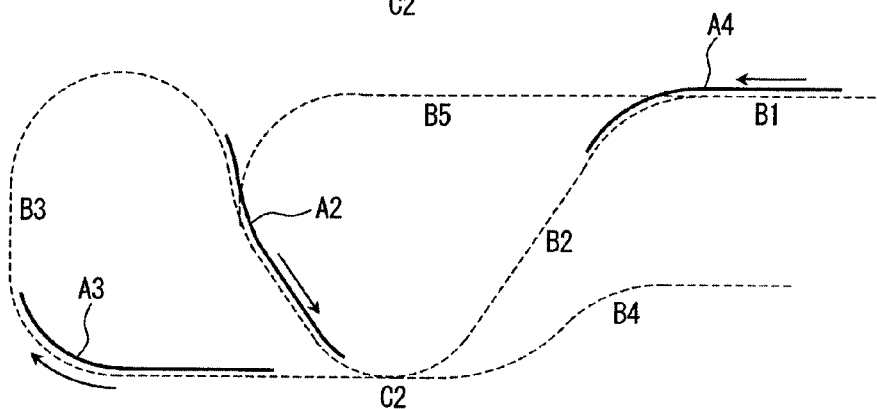

Subsequently, when the document A3 passes the scan position C2 and its trailing edge is transported to the transportation path B3, the document A2 moves to the scan position C2 from the transportation path B3, and its second surface is scanned (FIG. 7F). Specifically, the scanning is carried out at the scan position C2 in an order of the second surface of the document A1, the first surface of the document A3, and the second surface of the document A2. FIGS. 6C and 7F represent states ahead by a single document, and it is possible to carry out the consecutive scanning by repeating the states of FIGS. 6C to 7E in order after the state of FIG. 7F.

The alternating method is a scanning method that reduces the scanning time per document by simultaneously transporting the two or more documents along the transportation path B3, alternately moving the documents to the scan position C2 from the transportation paths B2 and B3, and carrying out the scanning of the first surface and the second surface alternately at the scan position C2. Specifically, the three or more documents A1 to A3 are simultaneously transported along the transportation route and it is possible to obtain the highest throughput. Although the alternating method can reduce the scanning time per document even more as compared to the batch method, it cannot be applied unless the document length is ⅓ of the length of the transportation path B3 or shorter.

FIG. 8 to FIG. 11 are views each illustrating one example of the supply timing of the document A in each scanning method, and each illustrating the transportation position of the preceding document A when the document is supplied.

Figure 8:
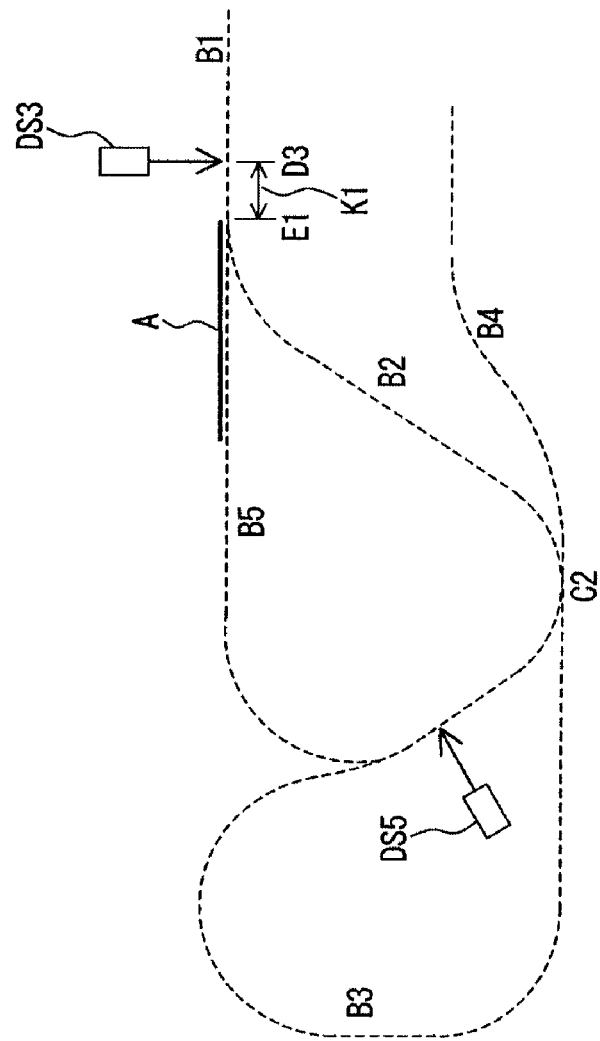
FIG. 8 is a view illustrating one example of a supply timing in the one-side scanning.

FIG. 8 is the view illustrating the one example of the supply timing in the one-side scanning. In the case of the one-side scanning, the succeeding document is supplied when the trailing edge of the previous document A arrives at a reference supply position E1 on the transportation route.

The reference supply position E1 is positioned to the downstream side from the detection position D3 of the document detecting sensor DS3 that is closest to the reference supply position E1 by a distance K1. Therefore, the supply timing in the one-side scanning is determined by measuring the transportation distance of the document A after the document detecting sensor DS3 detects the trailing edge of the document A. In this manner, it is possible to maintain the transportation interval constant regardless of the document length by determining the supply timing of the succeeding document based on a position of the trailing edge of the document A. The transportation distance of the document A can be obtained from a rotational amount of the transportation motor. The rotational amount can be obtained, for example, by counting the number of steps of driving signals supplied to the transportation motor.

FIG. 9 is the view illustrating the one example of the supply timing in the double-side scanning of the sequential method. In the case of the double-side scanning of the sequential method, the succeeding document is supplied when the trailing edge of the preceding document A arrives at a reference supply position E2.

The reference supply position E2 is positioned to the upstream side from the detection position D5 of the document detecting sensor DS5 that is closest to the reference supply position E2. Therefore, when the leading edge of the document A is determined to have arrived at a reference supply position T2 that is on the downstream side from the detection position D5 by a distance K2, and the succeeding document is supplied. The reference supply position T2 is a position of the leading edge of the document A when the trailing edge of the document A is at the reference supply position E2, and varies depending on the length of the document A. Accordingly, the distance K2 from the detection position D5 to the reference supply position T2 is determined every time when a document is supplied based on the length of the document A detected by the document detecting sensor DS3.

Specifically, the supply timing in the double-side scanning of the sequential method is determined by, first, determining the reference supply position T2 from the length of the document A, and then measuring the transportation distance of the document A after the document detecting sensor DS5 detects the leading edge of the document A. In this manner, it is possible to maintain the transportation interval constant by considering the document length even when the supply timing of the succeeding document is determined based on a position of the leading edge of the document A.

Figure 10A:
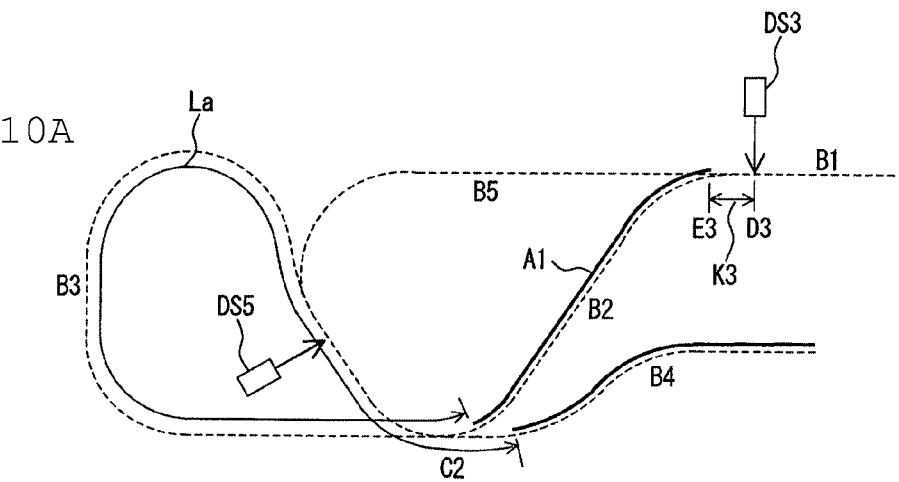
FIGS. 10A and 10B are views each illustrating one example of a supply timing in the double-side scanning of the batch method.
Figure 10B:
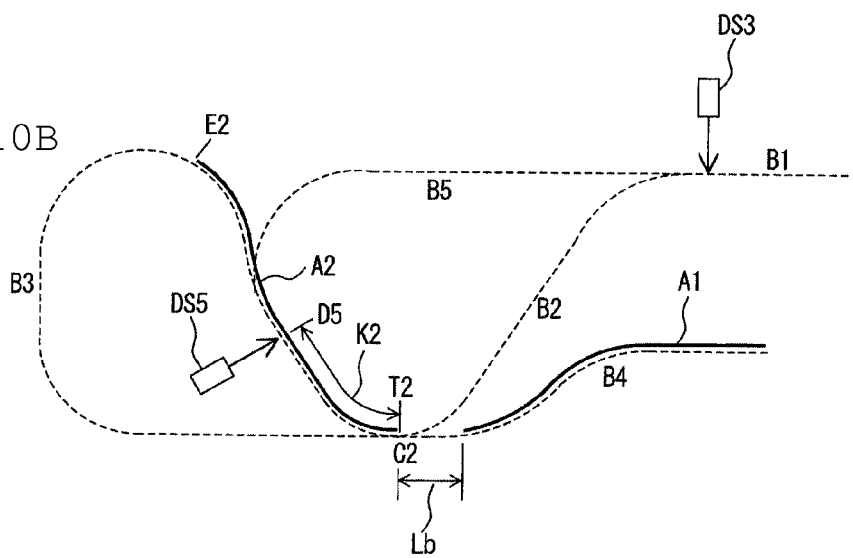

FIGS. 10A and 10B are the views each illustrating the one example of the supply timing in the double-side scanning of the batch method. FIG. 10A illustrates how documents that belong to the same document group as the preceding document A1 are supplied repeatedly at the short transportation interval Lb. Further, FIG. 10B illustrates how documents that belong to a document group different from the group to which the preceding documents A1 and A2 belong are supplied at the long transportation interval La.

As illustrated in FIG. 10A, in the double-side scanning of the batch method, when supplying the document at the short transportation interval Lb, the succeeding document is supplied when the trailing edge of the previous document A1 that has been supplied immediately before arrives at a reference supply position E3 on the transportation route. The reference supply position E3 is positioned on the downstream side from the detection position D3 of the document detecting sensor DS3 that is closest to the reference supply position E3 by a distance K3, and determined according to the transportation interval Lb. For example, when the transportation interval Lb is longer than the transportation interval L in the one-side scanning, the transportation distance K3 is longer than the transportation distance K2 in the one-side scanning, and the reference supply position E3 is positioned on the downstream side from the reference supply position E1 in the one-side scanning.

On the other hand, as illustrated in FIG. 10B, when supplying the document at the long transportation interval La, the succeeding document is supplied when the trailing edge of the previous document A2 that has been supplied immediately before arrives at the reference supply position E2. The reference supply position E2 is the same as described in the case of the double-side scanning of the sequential method, and the supply timing is determined in the same manner as in the case of the double-side scanning of the sequential method.

Figure 11:
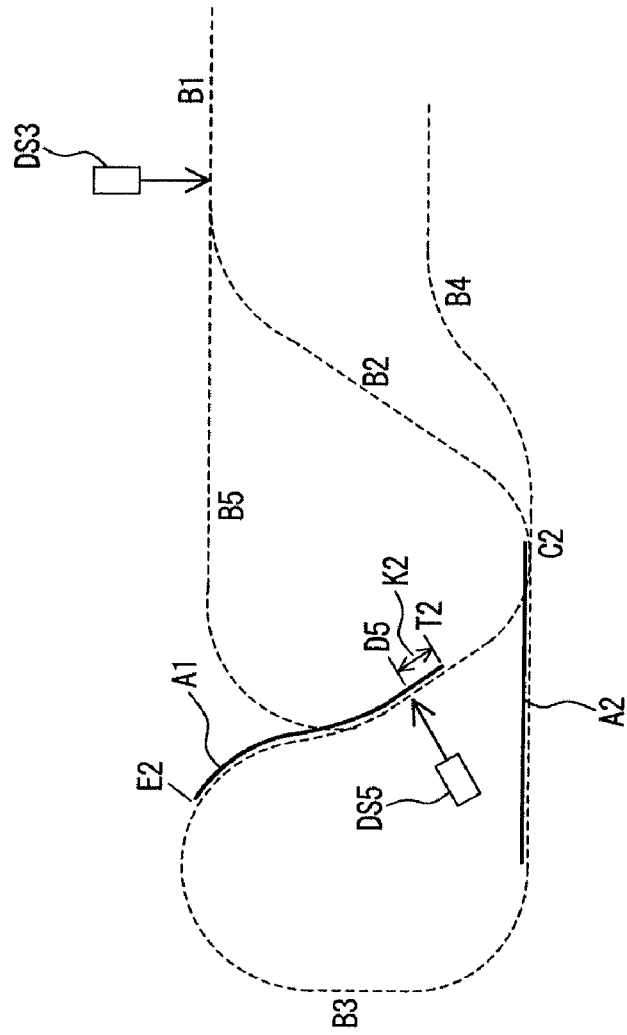
FIG. 11 is a view illustrating one example of a supply timing in the double-side scanning of the alternating method.

FIG. 11 is the view illustrating the one example of the supply timing in the double-side scanning of the alternating method. In the case of the double-side scanning of the alternating method, the succeeding document is supplied when the trailing edge of the most preceding document A arrives at the reference supply position E2 on the transportation path B3.

In both of the one-side scanning and in the double-side scanning of the sequential method, the supply timing is determined based on the position of the document that is last supplied, i.e., the preceding document A that has been supplied immediately before. On the other hand, in the double-side scanning of the alternating method, the supply timing is determined based on the position of the most preceding document A along the transportation path B3. In the figure, the supply timing is determined based on the preceding document A1 that is further before the document A2 that is immediately before. Other than this point, the method of determining the supply timing is completely the same as the case of the double-side scanning of the sequential method.

Specifically, the supply timing is determined by determining the reference supply position T2 based on the length of the preceding document A1 that is further before the immediately previous document A2, then measuring the transportation distance of the document A after the document detecting sensor DS5 detects the leading edge of the document A1, and determining that the leading edge of the document A has arrived at the reference supply position T2.

Figure 12:
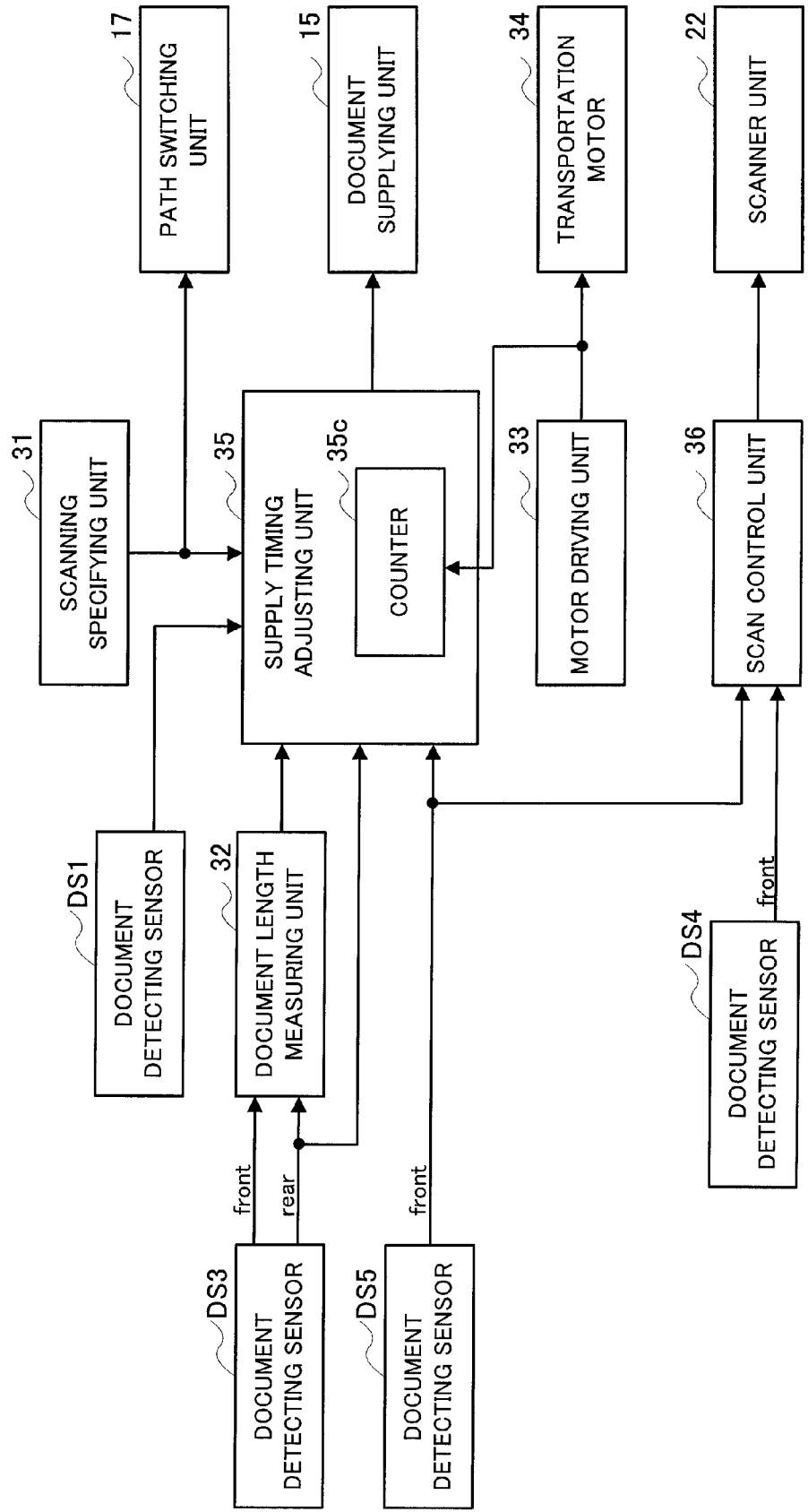
FIG. 12 is a functional block diagram illustrating one exemplary structure of the main section of the MFP 100 in FIG. 1.

FIG. 12 is a functional block diagram illustrating one exemplary structure of the main section of the MFP 100 in FIG. 1. The MFP 100 is configured by, the document detecting sensors DS1 and DS3 to DS5, the document supplying unit 15, the path switching unit 17, the scanner unit 22, a scanning specifying unit 31, a document length measuring unit 32, a motor driving unit 33, the transportation motor 34, a supply timing adjusting unit 35, and a scan control unit 36.

The document detecting sensor DS1 detects whether or not the document A is placed in the paper feed tray 11, and outputs a detection signal to the supply timing adjusting unit 35.

The document detecting sensor DS3 is a document detector that monitors the detection position D3 on the transportation path B1 and detects the document A immediately after it is supplied by the document supplying unit 15. When the leading edge and the trailing edge of the document A are detected, the document detecting sensor DS3 outputs a leading edge detection signal and a trailing edge detection signal, respectively. Further, the document detecting sensors DS4 and DS5 respectively monitor the detection positions D4 and D5 on the transportation paths B2 and B3, and each outputs a leading edge detection signal and when the leading edge of the document A is detected.

The scanning specifying unit 31 (scanning specification means) specifies one of the one-side scanning and the double-side scanning as the scanning method of the document based on a user operation to the operation input unit 21a of the operation panel 21. In the case of the double-side scanning, one of the sequential method, the batch method, and the alternating method is further specified as a detailed scanning method. The detailed scanning method in the double-side scanning can be specified based on the document length measured by the document length measuring unit 32 instead of the user operation.

The path switching unit 17 switches between the double-side path and the one-side path based on the scanning method specified by the scanning specifying unit 31. Specifically, when the one-side scanning is specified, the transportation path B5 is selected, and when the double-side scanning is specified, the transportation path B3 is selected.

The document length measuring unit 32 counts the number of steps of the driving signals supplied from the motor driving unit 33 to the transportation motor 34 based on the leading edge detection signal and the trailing edge detection signal from the document detecting sensor DS3, thereby obtaining the document length. Specifically, the document length is obtained from the rotational amount of the motor from the passing of the leading edge of the document A at the detection position D3 until the passing of the trailing edge of the document A at the detection position D3. In the present preferred embodiment, the document length is detected using the document detecting sensor DS3, but the document length can be detected using a sensor on the upstream side from the document detecting sensor DS5, for example, the document detecting sensor DS4.

The motor driving unit 33 generates a driving signal that is supplied to the transportation motor 34. The transportation motor 34 is a step motor in which the transportation rollers 16 are coupled to a rotary shaft of the motor, and the transportation rollers 16 rotate in synchronization with each other by a driving force of the transportation motor 34.

When the document A is placed in the paper feed tray 11, the supply timing adjusting unit 35 generates supply signals when it is determined that the trailing edge of the preceding document A has arrived the reference supply positions E1 to E3, and controls the supply timing of the document by the document supplying unit 15. The supply signals are generated based on the detection signals from the document detecting sensors DS3 and DS5 and the driving signals from the motor driving unit 33, but a generating method varies depending on the scanning method specified by the scanning specifying unit 31.

The supply signal is generated based on a value of the count number by a counter 35c within the supply timing adjusting unit 35. The counter 35c is a counting device that counts the number of steps of the driving signal, and clears the value of the count number based on the detection signals from the document detecting sensors DS3 and DS5, and when the value of the count number subsequently reaches the predetermined values K1 to K3, the supply signals are outputted from the supply timing adjusting unit 35. Specifically, the supply signals are outputted when the document A is transported by a predetermined distance after the preceding document A is detected by the document detecting sensors DS3 and DS5.

If the one-side scanning is being specified, the supply signal is outputted from the supply timing adjusting unit 35 when the trailing edge of the preceding document A arrives at the reference supply position E1 such that the transportation interval corresponds to L. Specifically, the supply signal is generated when the counter 35c counts that the transportation distance of the document A has reached the value K1 after the trailing edge detection signal is outputted from the document detecting sensor DS3. The value K1 is a predetermined value that is given in advance.

If the double-side scanning of the sequential method is being specified, the supply signal is outputted from the supply timing adjusting unit 35 when the trailing edge of the preceding document A arrives at the reference supply position E2 such that the transportation interval corresponds to La. Specifically, the supply signal is generated when the counter 35c counts that the transportation distance of the document A has reached the value K2 after the leading edge detection signal is outputted from the document detecting sensor DS5. The value K2 is obtained based on the document length measured by the document length measuring unit 32.

If the double-side scanning of the batch method is being specified, the transportation interval varies depending on whether or not the preceding document and the succeeding document belong to the same document group. If the preceding document and the succeeding document do not belong to the same document group, the supply signal is outputted from the supply timing adjusting unit 35 when the trailing edge of the preceding document A reaches the reference supply position E2 such that the transportation interval corresponds to the long value La. On the other hand, if the preceding document and the succeeding document belong to the same document group, the supply signal is outputted from the supply timing adjusting unit 35 when the trailing edge of the preceding document A reaches the reference supply position E3 such that the transportation interval corresponds to the short value Lb.

Specifically, when taking the long transportation interval La, the supply signal is generated when the counter 35c counts that the transportation distance of the document A has reached the value K2 after the leading edge detection signal is outputted from the document detecting sensor DS5. On the other hand, when taking the short transportation interval Lb, the supply signal is generated when the counter 35c counts that the transportation distance of the document A has reached the value K3 after the trailing edge detection signal is outputted from the document detecting sensor DS3. The value K3 is a predetermined value that is given in advance If the double-side scanning of the alternating method is being specified, the supply signal is outputted from the supply timing adjusting unit 35 when the trailing edge of the preceding document A arrives at the reference supply position E2 such that the interval from the most preceding document out of the two or more documents A that are simultaneously transported along the transportation path B3 corresponds to La. Specifically, the supply signal is generated when the counter 35c counts that the transportation distance of the document A has reached the value K2 after the leading edge detection signal is outputted from the document detecting sensor DS5.

The scan control unit 36 outputs a scan signal to the scanner unit 22 based on the leading edge detection signals from the document detecting sensors DS4 and DS5. The scanner unit 22 starts the scanning process based on this scan signal.

Figure 13:
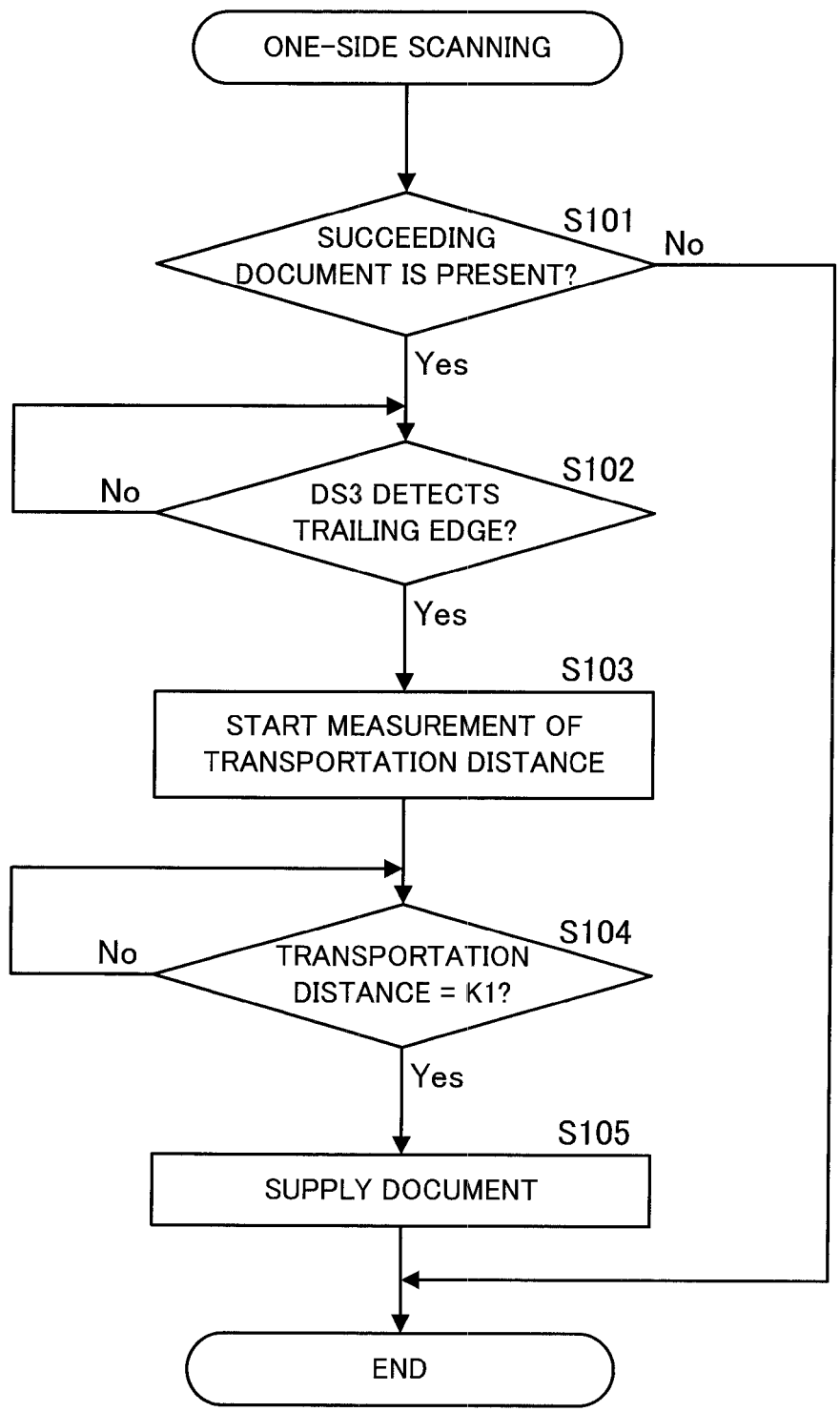
FIG. 13 is a flowchart illustrating one example of a document supply process in the one-side scanning.

Steps S101 to S105 in FIG. 13 illustrate a flowchart showing one example of a document supply process in the one-side scanning, which starts after the document supply is carried out. First, it is determined whether or not the succeeding document is placed in the paper feed tray 11 based on the detection result of the document detecting sensor DS1 (Step S101). If, as a result, the document A is not present within the paper feed tray 11, the process is terminated.

If the document A is present within the paper feed tray 11, the document detecting sensor DS3 detects the trailing edge of the preceding document A (Step S102). When the trailing edge of the preceding document A arrives at the detection position D3, and the trailing edge detection signal is outputted from the document detecting sensor DS3, the counter 35c is cleared, and the measurement of the transportation distance of the document A after the detection starts (Step S103).

The counter 35c measures the transportation distance of the document A after the detection by counting the number of steps of the driving signals supplied from the transportation motor 34. Then, when the measured transportation distance reaches the predetermined value K1, the supply signal is outputted from the supply timing adjusting unit 35 (Step S104). The document supplying unit 15 supplies the succeeding document from the paper feed tray 11 based on the supply signal, and the process is terminated (Step S105). When the document is supplied and the process is terminated in this manner, the document supply process of FIG. 13 is resumed.

Figure 14:
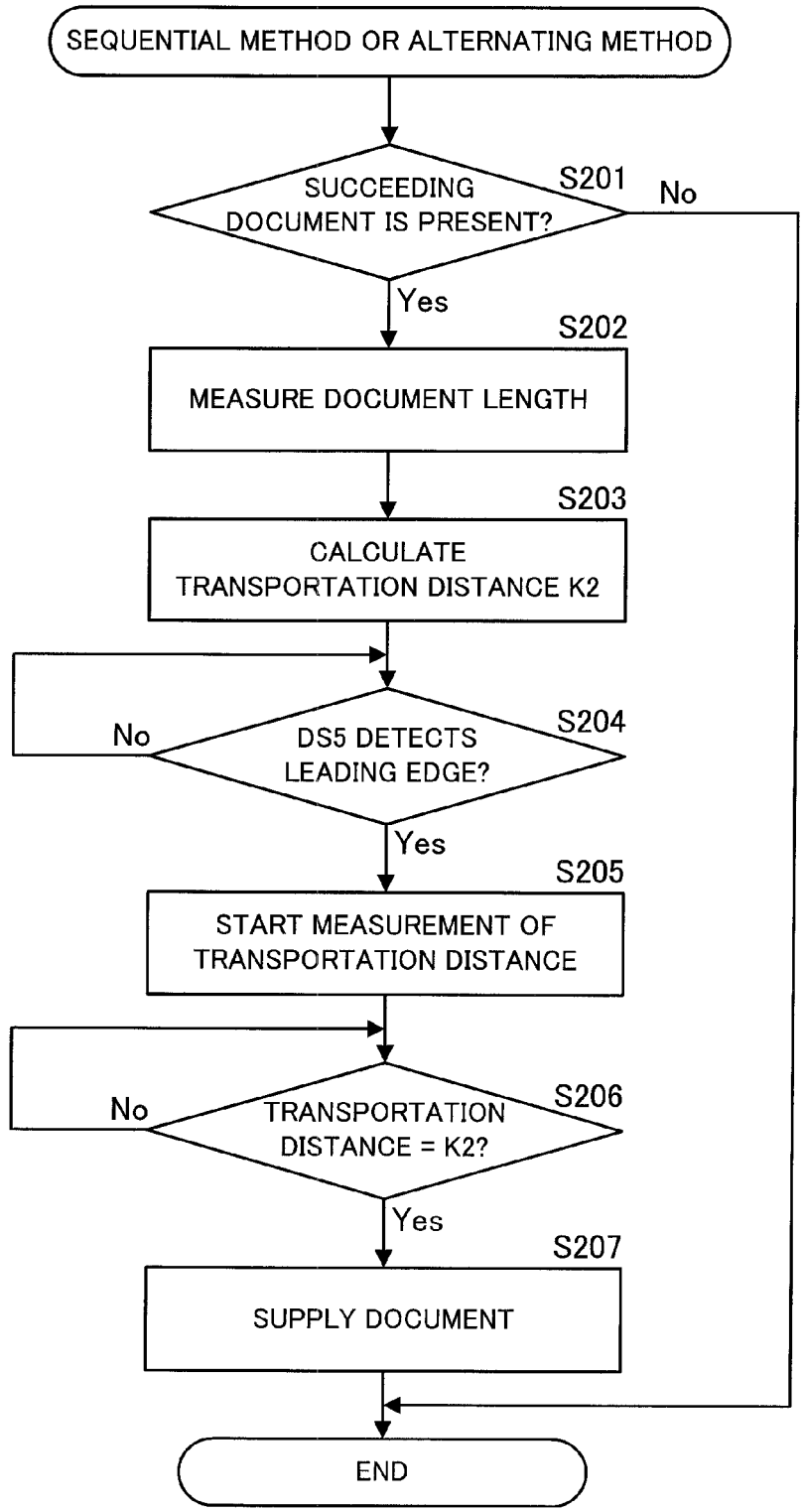
FIG. 14 is a flowchart illustrating one example of a document supply process in the double-side scanning of the sequential method or the alternating method.

Steps S201 to S207 in FIG. 14 illustrate a flowchart showing one example of the document supply process in the double-side scanning of the sequential method or the alternating method, which starts after the document supply is carried out. First, the case of the double-side scanning of the sequential method is described. It is determined whether or not the succeeding document is placed in the paper feed tray 11 based on the detection result of the document detecting sensor DS1 (Step S201). If, as a result, the document A is not present within the paper feed tray 11, the process is terminated.

If the document A is present within the paper feed tray 11, the document length measuring unit 32 measures the document length of the preceding document A based on the detection result of the document detecting sensor DS3 (Step S202). The supply timing adjusting unit 35 calculates the transportation distance K2 for determining the supply timing based on this document length (Step S203). Next, the document detecting sensor DS5 detects the leading edge of the document A (Step S204). When the leading edge of the document A arrives at the detection position D5, and the leading edge detection signal is outputted from the document detecting sensor DS5, the counter 35c is cleared, and the measurement of the transportation distance of the document A after the detection starts (Step S205).

Then, when the transportation distance measured by the counter 35c reaches the value K2 that has previously been calculated, the supply signal is outputted from the supply timing adjusting unit (Step S206). The document supplying unit 15 supplies the succeeding document from the paper feed tray 11 based on the supply signal, and the process is terminated (Step S107). When the document is supplied and the process is terminated in this manner, the document supply process of FIG. 14 is resumed.

In the case of the double-side scanning of the alternating method, the succeeding document is supplied based on the position of the most preceding document A1 along the transportation path B3. Therefore, the document length used to calculate the transportation distance K2 in Step S203 is the document length of the document A1 that has been measured and stored in Step S202 in the previous document supply process, instead of the document length of the document A2 that has been measured in immediately previous Step S202. Other than this point, the document supply process in the double-side scanning of the alternating method is the same as that in the sequential method.

Figure 15:
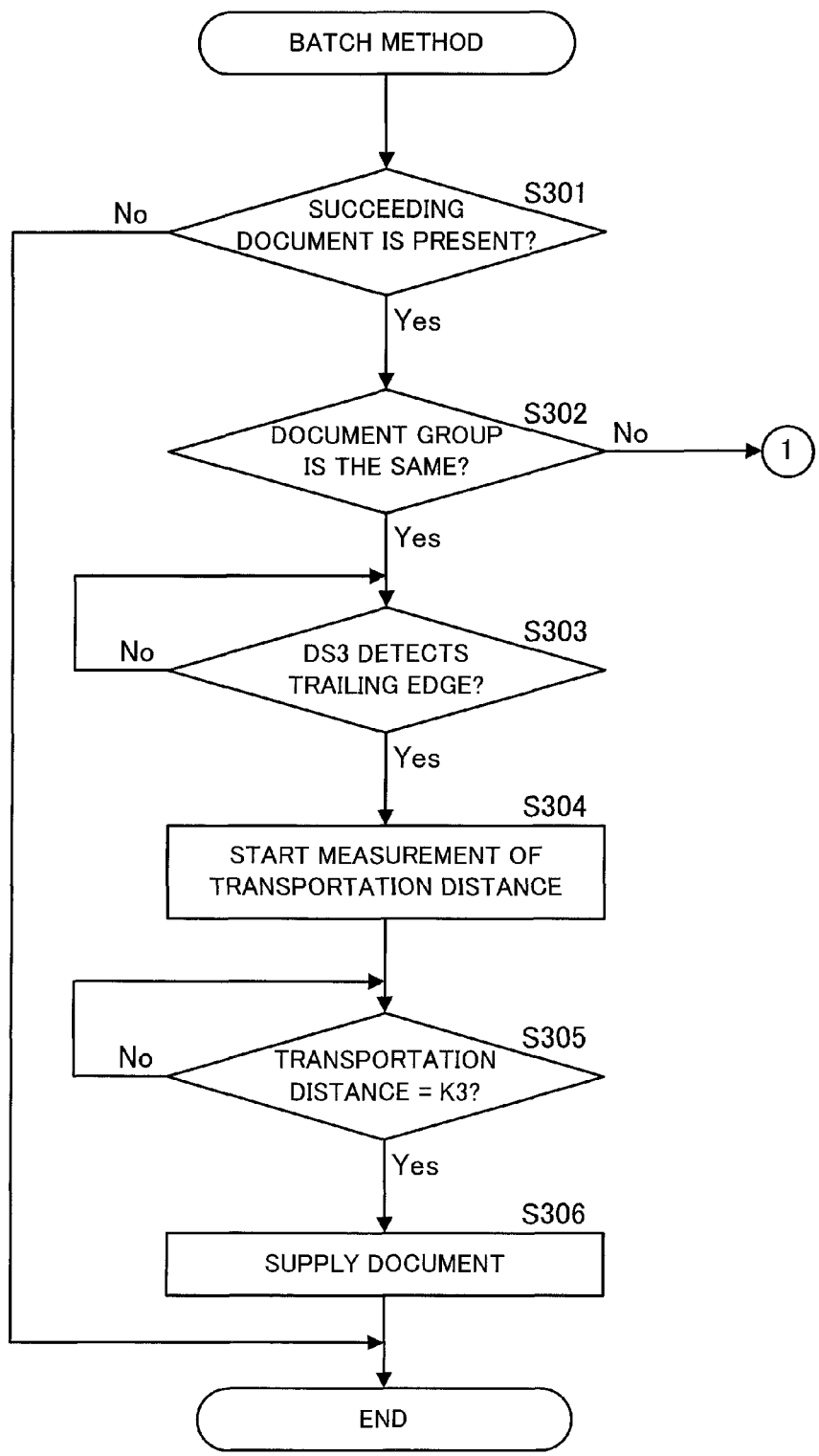
FIG. 15 is a flowchart illustrating one example of a document supply process in the double-side scanning of the batch method.
Figure 16:
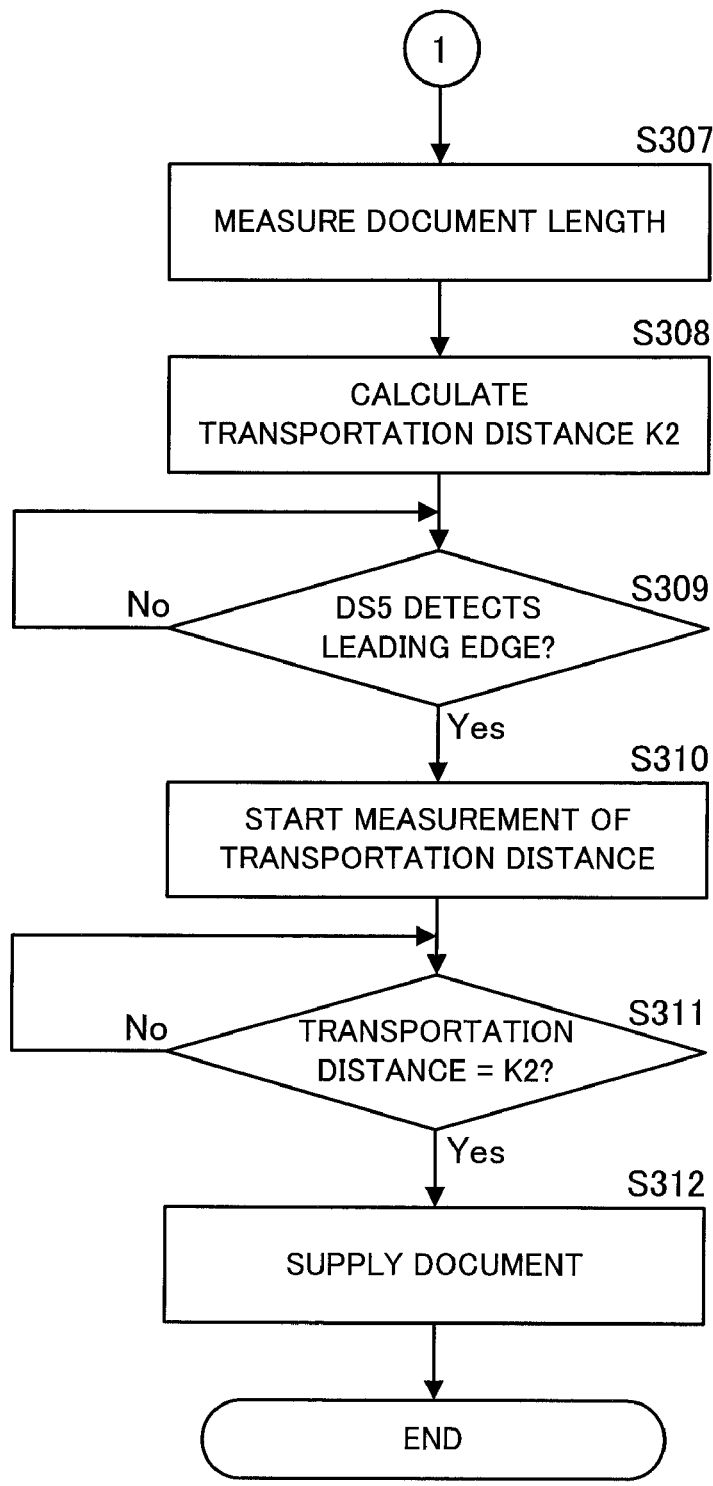
FIG. 16 is a flowchart following FIG. 15.

Steps S301 to S312 in FIG. 15 and FIG. 16 illustrate flowcharts showing one example of the document supply process in the double-side scanning of the batch method, which starts after the document supply is carried out. First, it is determined whether or not the succeeding document is placed in the paper feed tray 11 based on the detection result of the document detecting sensor DS1 (Step S301). If, as a result, the document A is not present within the paper feed tray 11, the process is terminated.

Next, it is determined whether the succeeding document belongs to the same document group to which the preceding document A belongs (Step S302). In this case, the two or more documents A that are simultaneously transported on the transportation path B3 are considered to be in the same document group. If the succeeding document belongs to the same document group, the process proceeds to Step S303, and if not, the process proceeds to Step S307.

The process of Steps S303 to S306 is completely the same as that of Steps S102 to S105 in FIG. 13 (the document supply process in the one-side scanning) other than the difference of the transportation distances K1 and K3. Further, the process of Steps S307 to S312 is completely the same as that of Steps S202 to S207 in FIG. 14 (the document supply process in the sequential method). Accordingly, overlapping explanations are omitted.

According to the present preferred embodiment, it is possible to specify the scanning method such as the one-side scanning, the double-side scanning of the sequential method, the double-side scanning of the batch method, and the double-side scanning of the alternating method, and to change the transportation intervals L, La, Lb between the documents depending on the specified scanning method. For example, the transportation interval L when the one-side scanning is specified is different from the transportation interval La when the double-side scanning of the sequential method is specified.

In the image scanning device described above, when detecting the position of the preceding document in order to determine the supply timing of the succeeding document, it is possible to reduce the transportation distances K1 to K3 of the documents to be measured after the detection by selecting an appropriate one of the document detecting sensors DS3 and DS5 that is associated with the scanning method out of the two or more document detecting sensors DS3 and DS5.

When the previous document is detected using the same document detecting sensor and the transportation distance measured after the detection is changed according to the transportation intervals in order to change the transportation intervals of an image scanning device, a maximum value of the transportation distance to be measured becomes long depending on a difference between selectable transportation intervals. In contrast, the image scanning device according to the present preferred embodiment, the document detecting sensors DS3 and DS5 are selected according to the transportation intervals L, La, and Lb, and the previous document is detected at the different detection positions D3 and D5 on the transportation route. Accordingly, it is possible to prevent the maximum value of the transportation distances K1 to K3 of the document to be measured from becoming long compared to a difference between the transportation intervals (La to L).

Therefore, according to the present preferred embodiment, it is possible to improve an accuracy of the supply timing in the image scanning device capable of selecting the different transportation intervals, and to improve an accuracy of the transportation interval. Further, it is possible to reduce a size of a circuit arranged to measure the transportation distance of the document. For example, it is possible to decrease the number of digits of the counter 35c. Thus, it is possible to provide the MFP 100 as described above at a moderate price.

Moreover, according to the present preferred embodiment, it is possible to select the scanning method that cyclically repeats the two or more different transportation intervals. For example, when the double-side scanning of the batch method is specified, the transportation interval La between the document groups can be different from the transportation interval Lb between the documents in the same document group. In the image scanning device described above, when detecting the position of the preceding document in order to determine the supply timing of the succeeding document, it is possible to prevent the maximum value of the transportation distances K2 and K3 of the document to be measured from becoming long compared to a difference between the transportation intervals (La to Lb) by selecting an appropriate one of the document detecting sensors DS3 and DS5 that is associated with the transportation intervals La and Lb out of the two or more document detecting sensors DS3 and DS5.

While the present invention has been described with respect to the preferred embodiments thereof, it will be apparent to those skilled in the art that the disclosed invention may be modified in numerous ways and may assume many preferred embodiments other than those specifically set out and described above. Accordingly, it is intended by the appended claims to cover all modifications of the present invention that fall within the true spirit and scope of the present invention.

What is claimed is:
1. An image scanning device, comprising:
    a scanning specifying unit arranged to specify one of at least two scanning methods, each of the at least two scanning methods having a different transportation interval between documents;

at least two document detecting units arranged to detect a document at different positions along a transportation route;

a supply timing adjusting unit arranged: (i) to measure a transportation distance of the document after the document has been detected by the at least two document detecting units, and (ii) to generate a supply signal based on a result of detection by one of the at least two document detecting units, the one of the at least two document detecting units used in generating the supply signal corresponding to the scanning method specified by the scanning specifying unit; and a document supplying unit arranged to supply a document from a paper feed tray based on the supply signal; wherein the at least two document detecting units include a first document detecting unit used only in a first mode and a second document detecting unit used only in a second mode.

2. The image scanning device according to claim 1, wherein the second document detecting unit is arranged to detect a document on a downstream side from the first document detecting unit;

the scanning specifying unit is arranged to specify one of double-side scanning having a long transportation interval and one-side scanning having a short transportation interval; and the supply timing adjusting unit is arranged to generate, when the first mode, which is a one-side scanning mode, is specified, a supply signal based on a result of detection by the first document detecting unit, and, when the second mode, which is a double-side scanning mode, is specified, generate a supply signal based on a result of detection by the second document detecting unit.

3. The image scanning device according to claim 2, further comprising:

a path switching unit arranged to select, at a branch point along the transportation route, one of a first transportation path for the double-side scanning and a second transportation path for the one-side scanning; wherein the first transportation path includes a U-turn path arranged to cause a document that has passed a scan position to turn around and to move again to the scan position from an opposite direction;

the second transportation path is arranged to join the U-turn path without passing the scan position;

the first document detecting unit is arranged to detect the document on an upstream side from the branch point; and the second document detecting unit is arranged to detect the document on the first transportation path.

4. The image scanning device according to claim 2, wherein the supply timing adjusting unit is arranged to generate a supply signal based on a result of detection of a trailing edge of the document by the first document detecting unit, and to generate a supply signal based on a result of detection of a leading edge of the document by the second document detecting unit.

5. The image scanning device according to claim 4, further comprising:

a length detecting unit arranged to detect a length of the document; wherein the supply timing adjusting unit is arranged to calculate a reference supply position on the downstream side from a position of detection by the second document detecting unit based on the length of the document, and to generate the supply signal when the leading edge of the document reaches the reference supply position.

6. The image scanning device according to claim 1, wherein the at least two document detecting units include a first document detecting unit and a second document detecting unit arranged to detect a document on a downstream side from the first document detecting unit; and the first document detecting unit and the second document detecting unit are both disposed along a common route of a first transportation path for double-side scanning and a second transportation path for one-side scanning.

7. A document transporting method comprising:

a scanning specifying step of specifying one of at least two scanning methods, each of the at least two scanning methods having a different transportation interval between documents;

a detecting step of detecting a document that is being transported using at least two document detecting sensors with different detection positions;

a supply timing adjusting step of: (i) measuring a transportation distance of the document after the document has been detected by the at least two document detecting sensors in the document detecting step, and (ii) generating a supply signal based on a result of detection by one of the at least two document detecting sensors, the one of the at least two document detecting sensors used in generating the supply signal corresponding to the specified scanning method; and a document supplying step of supplying a document from a paper feed tray based on the supply signal; wherein the at least two document detecting sensors include a first document detecting sensor used only in a first one of the at least two scanning methods and a second document detecting sensor used only in a second one of the at least two scanning methods.

8. The document transporting method according to claim 7, wherein in the scanning specifying step, one of double-side scanning and one-side scanning is specified, and in the supply timing adjusting step, when the first one of the at least two scanning methods, which is the one-side scanning, is specified, a supply signal is generated based on a result of detection by the first document detecting sensor, and, when the second one of the at least two scanning methods, which is the double-side scanning, is specified, a supply signal is generated based on a result of detection by the second document detecting sensor that detects a document on a downstream side from the first document detecting sensor.

9. The document transporting method according to claim 8, wherein in the supply timing adjusting step, when the one-side scanning is specified, the supply signal is generated based on the result of detection by the first document detecting sensor that is on the upstream side from a branch point between a first transportation path for the double-side scanning and a second transportation path for the one-side scanning, and, when the double-side scanning is specified, the supply signal is generated based on the result of detection by the second document detecting sensor on the first transportation path.

10. The document transporting method according to claim 8, wherein in the supply timing adjusting step, a supply signal is generated based on a result of detection of a trailing edge of the document by the first document detecting sensor, and a supply signal is generated based on a result of detection of a leading edge of the document by the second document detecting sensor.

11. The document transporting method according to claim 10, further comprising:

a length detecting step of detecting a length of the document, wherein in the supply timing adjusting step, a reference supply position on the downstream side from a position of detection by the second document detecting sensor is calculated based on the length of the document, and generates the supply signal when the leading edge of the document reaches the reference supply position.

* * * * *